(12) United States Patent
Sada et al.

(10) Patent No.: US 8,189,787 B2
(45) Date of Patent: *May 29, 2012

(54) DATA TRANSMITTING APPARATUS, DATA RECEIVING APPARATUS AND DATA COMMUNICATION APPARATUS

(75) Inventors: Tomokazu Sada, Osaka (JP); Masaru Fuse, Osaka (JP); Satoshi Furusawa, Osaka (JP); Tsuyoshi Ikushima, Nara (JP)

(73) Assignee: Panasonic Corporation, Osaka (JP)

( * ) Notice: Subject to any disclaimer, the term of this patent is extended or adjusted under 35 U.S.C. 154(b) by 1150 days.

This patent is subject to a terminal disclaimer.

(21) Appl. No.: 12/063,003

(22) PCT Filed: Oct. 13, 2006

(86) PCT No.: PCT/JP2006/320482
§ 371 (c)(1),
(2), (4) Date: Feb. 5, 2008

(87) PCT Pub. No.: WO2007/046302
PCT Pub. Date: Apr. 26, 2007

(65) Prior Publication Data
US 2009/0103721 A1   Apr. 23, 2009

(30) Foreign Application Priority Data

Oct. 17, 2005   (JP) ................ 2005-302101

(51) Int. Cl.
H04L 29/06   (2006.01)
(52) U.S. Cl. ............ 380/268; 380/42; 380/43; 380/255; 380/256; 713/150
(58) Field of Classification Search ............ 713/150; 726/14; 380/259, 268, 42, 43, 287; 714/760, 714/776, 777, 798, 810
See application file for complete search history.

(56) References Cited

U.S. PATENT DOCUMENTS 5,161,244 A * 11/1992 Maurer .................... 380/43
(Continued)

FOREIGN PATENT DOCUMENTS

JP   09-205420   8/1997
(Continued)

OTHER PUBLICATIONS

International Search Report mailed Jan. 16, 2007 for International Application No. PCT/JP2006/320482.

(Continued)

Primary Examiner — Eleni Shiferaw
Assistant Examiner — Hilary Branske
(74) Attorney, Agent, or Firm — Wenderoth, Lind & Ponack, L.L.P.

(57) ABSTRACT

A data communication apparatus is highly concealable and significantly increases time necessary for an eavesdropper to analyze cipher text. A multi-level code generation section generates, by using predetermined key information, a multi-level code sequence in which a signal level changes so as to be random numbers. The multi-level processing section combines a multi-level code sequence and information data, and generates a multi-level signal having a level corresponding to a combination of the multi-level code sequence and the information data. In the multi-level code generation section, a random number sequence generation section generates a binary random number sequence by using the predetermined key information. A multi-level conversion section generates a multi-level code sequence from the binary random number sequence in accordance with a predetermined encoding rule.

26 Claims, 16 Drawing Sheets

U.S. PATENT DOCUMENTS

| | | | |
|---|---|---|---|
| 7,835,524 B2 * | 11/2010 | Ikushima et al. | 380/268 |
| 2003/0182664 A1 * | 9/2003 | Lusky et al. | 725/111 |
| 2004/0190719 A1 * | 9/2004 | Lo | 380/255 |
| 2004/0243258 A1 * | 12/2004 | Shattil | 700/73 |
| 2005/0010848 A1 * | 1/2005 | Yokokawa et al. | 714/755 |
| 2005/0152540 A1 * | 7/2005 | Barbosa | 380/28 |

FOREIGN PATENT DOCUMENTS

| | | |
|---|---|---|
| JP | 11-085474 | 3/1999 |
| JP | 2005-057313 | 3/2005 |

OTHER PUBLICATIONS

"Cryptography and Network Security: Principles and Practice" translated by Keiichiro Ishibashi et al., Pearson Education, 2001, pp. 151-186 with the original English document pp. 131-159.

"Applied Cryptography" translated by Mayumi Adachi et al., Softbank publishing, 2003, pp. 411-441 with the original English document pp. 369-395.

"Experimental study for Yuen-Kim protocol of quantum key distribution with unconditional secure[online]" quant-ph /0212050, p. 1-5, Dec. 9, 2002. [retrieved on Dec. 27, 2006] Retrieved from the Internet: <URL:http://arxiv.org/list/quant-ph/0212>, all pages.

"Ryoshi Yuragi Kakusan Denso ni Okeru Tachi Fugoka Hoshiki no Kento (A Study of Multi-level Coding Scheme in High-secure Transmission Systems Using Quantum Noise Diffusion Technique)", IEICE Communications Society Conference Koen Ronbunshu 2, p. 211, Sep. 7, 2006, 3, Tachi Fugoka Hoshiki no Teian.

Reply to: "Comment on: 'How much security does Y-00 protocol provide us?'" [online]., Physics Letters A, vol. 346, p. 7-16, Aug. 18, 2005, [retrieved on Dec. 27, 2006] Retrieved from: Science Direct<URL:http://www.sciencedirect.com/>, all pages.

Reply to: Reply to: "Comment on: 'How much security does Y-00 protocol provide us?'" [online]. quant-ph/0509092, p. 1-9, Sep. 13, 2005, [retrieved on Dec. 27, 2006] Retrieved from the Internet: <URL:http://arxiv.org/list/quant-ph/0509>, particularly, 4 Reply to claims in [1].

* cited by examiner

F I G. 1 4
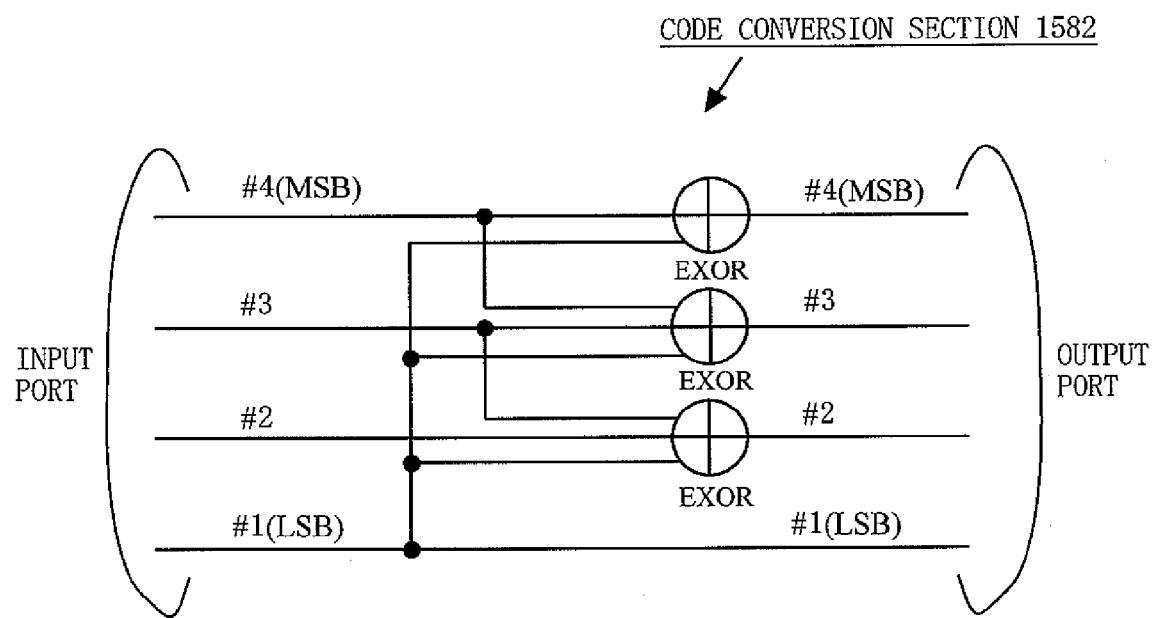

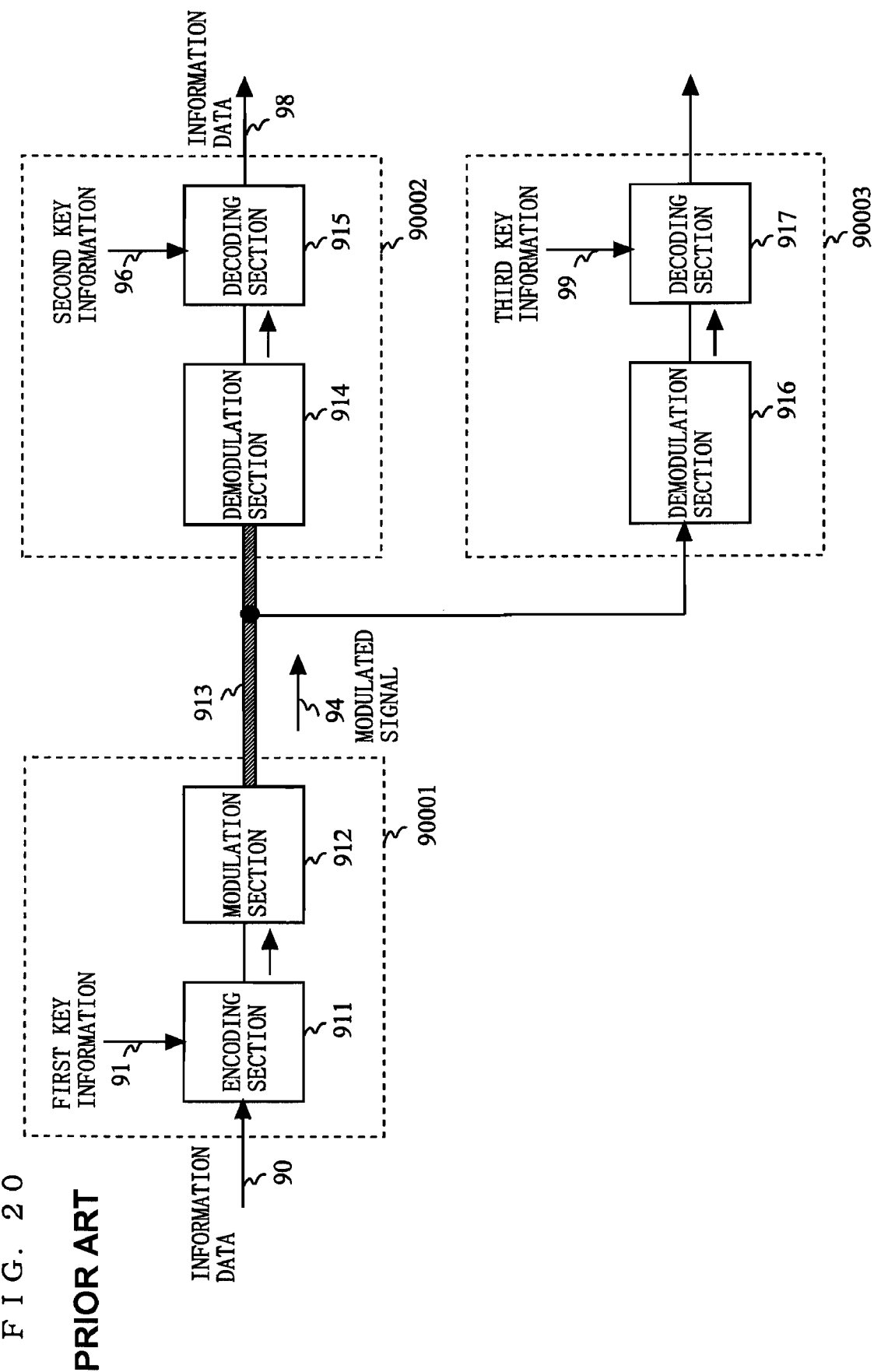

DATA TRANSMITTING APPARATUS, DATA RECEIVING APPARATUS AND DATA COMMUNICATION APPARATUS

TECHNICAL FIELD

The present invention relates to an apparatus for performing cipher communication which prevents unauthorized eavesdropping/interception by a third party. More specifically, the present invention relates to an apparatus for performing data communication between legitimate transmitting and receiving parties by selecting/setting a specific encoding/decoding (modulating/demodulating) method.

BACKGROUND ART

Conventionally, in order to perform communication between specific parties, there has been adopted a configuration in which original in formation (key information) for encoding/decoding is shared between transmitting and receiving ends, and secret communication is realized by performing a mathematical operation/inverse operation on information data (plain text) to be transmitted, in accordance with the information. FIG. 20 is a block diagram showing a configuration of a conventional data transmitting apparatus based on the configuration. As shown in FIG. 20, the conventional data communication apparatus includes a data transmitting apparatus 90001, a transmission line 913, and a data receiving apparatus 90002. The data transmitting apparatus 90001 is composed of an encoding section 911 and a modulation section 912. The data receiving apparatus 90002 is composed of a demodulation section 914 and a decoding section 915. When information data 90 and first key information 91 are inputted to the encoding section 911, and when second key information 96 is inputted to the decoding section 915, information data 98 is outputted from the decoding section 915. In order to describe eavesdropping by a third party, it is assumed that FIG. 20 includes an eavesdropper data receiving apparatus 90003 which is composed of an eavesdropper demodulation section 916 and an eavesdropper decoding section 917. Third key information 99 is inputted to the eavesdropper decoding section 917. Hereinafter, with reference to FIG. 20, an operation of the conventional data communication apparatus will be described.

In the data transmitting apparatus 90001, the encoding section 911 encodes (encrypts) the information data 90 by using first key information 91. The modulation section 912 modulates the information data, which is encoded by the encoding section 911, into a modulated signal 94 in a predetermined modulation format so as to be transmitted to the transmission line 913. In the data receiving apparatus 90002, the demodulation section 914 demodulates, in a predetermined demodulation method, the modulated signal 94 transmitted via the transmission line 913, and outputs the encoded information data. The decoding section 915 decodes (decrypts) the encoded information data by using the second key information 96, which is shared with the encoding section 911 and is identical to the first key information 91, and then outputs original information data 98.

When the eavesdropper data receiving apparatus 90003 eavesdrops a modulated signal (information data) which is transmitted between the data transmitting apparatus 90001 and the data receiving apparatus 90002, the eavesdropper demodulation section 916 causes a part of the modulated signal transmitted through the transmission line 913 to be divided, to be inputted thereto, and to foe demodulated in the predetermined demodulation method. The eavesdropper decoding section 917, thereafter, attempts to decode the same by using third key information 99. The eavesdropper decoding section 917 does not share key information with the encoding section 911. That is, the eavesdropper decoding section 917 performs decoding by using the third key information 99 which is different from the first key information 91, and thus cannot reproduce the original information data appropriately.

A mathematical encryption (or also referred to as a computational encryption or a software encryption) technique based on such a mathematical operation may be applied to an access system or the like, as described in publication of patent document 1, for example. In ether words, in the case of a PON (Passive Optical Network) configuration in which an optical signal transmitted from one optical transmitter is divided by an optical coupler so as to be distributed to optical receivers at a plurality of optical subscribers' households, the optical signal only desired by and supposed to foe directed to certain subscribers is inputted to all the optical receivers. Therefore, information data for respective subscribers is encoded by using key information which is different depending on the subscribers, whereby leakage/eavesdropping of mutual information may be prevented, and safe data communication may be realised.

Patent document 1: Japanese Laid-Open Patent Publication No. 9-205420
Non-patent document 1: "Cryptography and Network Security: Principles and Practice" translated by Keiichiro Ishibashi et al., Pearson Education, 2001
Non-patent document 2: "Applied Cryptography" translated by Mayumi Adachi et al., Softbank publishing, 2003

SUMMARY OF THE INVENTION

Problems to be Solved by the Invention

However, in the conventional data communication apparatuses based on the mathematical encryption technique, without having shared key information, an eavesdropper can decrypt/decode cipher text (a modulated signal or encoded information data), in theory, by using an operation based on all possible combinations of key information (all-possible attack) or by applying a special analysis algorithm. Particularly, since processing speed or a computer is improving remarkably in recent years, a problem is posed in that the cipher text can be decrypted within a finite length of time if a computer based on a new principle such as a quantum computer and the like is realized in the future.

Therefore, an object of the present invention is to cause the eavesdropper to have increased time to analyze the cipher text, and to provide a highly concealable data communication apparatus.

Solution to the Problems

The present invention is directed to a data transmitting apparatus performing cipher communication. To achieve the above objects, the data transmitting apparatus of the present invention comprises: a multi-level encoding section for inputting thereto predetermined key information and information data, and for generating a multi-level signal in which a signal level changes so as to be approximately random numbers; and a modulation section for generating a modulated, signal in a predetermined modulation format in accordance with the multi-level signal. The multi-level encoding section includes: a multi-level code generation section for generating, by using the predetermined key information, a multi-level code sequence in which a signal level changes so as to be random numbers; and a multi-level processing section for combining the multi-level code sequence and the information data in accordance with predetermined processing, and for generating the multi-level signal having a level corresponding to a combination of the multi-level code sequence and the information data. The multi-level code generation section includes: a random number sequence generation section for generating a binary random number sequence by using the predetermined key information; and a multi-level conversion section for generating the multi-level code sequence from the binary random number sequence in accordance with a predetermined encoding rule. The predetermined encoding rule specifies that binary bit sequences respectively having predetermined lengths are caused to correspond to respective multi levels of the multi-level code sequence uniquely, and that the number of digits of different bits (a hamming distance) between any adjoining binary bit sequences, which are allocated to arbitrary adjoining multi levels, is equal to the length of each of the binary bit sequences, or equal to a value less than the length of each of the binary bit sequences by 1 bit.

Preferably, the multi-level code generation section, further includes an interleaving section for performing a bit interleaving, which has a predetermined depth, on the binary random number sequence generated by the random number sequence generation section.

Preferably, the number of columns for the bit interleaving is equal to or more than twice a degree of linear complexity of the binary random number sequence generated by the random number sequence generation section. In addition, the number of rows for the bit interleaving is equal to or more than the length of each binary bit sequence allocated to each multi level.

Preferably, the length of each binary bit sequence caused to correspond to each multi level is equal to or more than 2 bits. In addition, the total number of the multi levels is equal to a power of 2. Further in addition, the binary bit sequences having lengths identical to one another are allocated to all the multi levels. Still further in addition, the multi levels are each represented by any one of an amplitude, a frequency and a phase, or by any combination selected from thereamong.

The present invention is directed to a data receiving apparatus. To attain the above-described object, the data receiving apparatus of the present invention comprises: a demodulation section for demodulating a modulated signal in a predetermined modulation format, and for outputting a multi-level signal; and a multi-level decoding section for inputting thereto predetermined key information and the multi-level signal, and for outputting information data. The multi-level decoding section includes: a multi-level code generation section for generating, by using the key information, a multi-level code sequence in which a signal level changes so as to be random numbers; and a multi-level decision section for deciding the multi-level signal in accordance with the multi-level code sequence, and for outputting the information data. The multi-level code generation section includes: a random number sequence generation section for generating a binary random number sequence by using the key information; and a multi-level conversion section for generating the multi-level code sequence from the binary random number sequence in accordance with a predetermined encoding rule. The predetermined encoding rule specifies that binary bit sequences respectively having predetermined lengths are caused to correspond to respective multi levels of the multi-level code sequence uniquely, and that the number of digits of different bits (hamming distance) between any adjoining binary bit sequences, which are allocated to arbitrary adjoining multi levels, is equal to the length of each of the binary bit sequences, or to a value less than the length of each of the binary bit sequences by 1 bit.

Preferably, the multi-level code generation section further includes an interleaving section for performing a bit interleaving, which has a predetermined depth, on the binary random number sequence generated by the random number sequence generation section.

Preferably, the number of columns for the bit interleaving is equal to or more than twice a degree of linear complexity of the binary random number sequence generated by the random number sequence generation section. In addition, the number of rows for the bit interleaving is equal to or more than the length of each binary bit sequence allocated to each multi level.

Preferably, the length of each binary bit sequence caused to correspond to each multi level is equal to or more than 2 bits. In addition, the total number of the multi levels is equal to a power of 2. Further in addition, the binary bit sequences having lengths identical to one another are allocated to all the multi levels. Still further in addition, the multi levels are each represented by any one of an amplitude, a frequency, and a phase, or by any combination selected from thereamong.

Further, the present invention is directed to a data communication apparatus for performing cipher communication. TO attain the above-described object, the data communication apparatus of the present, invention comprises: a data transmitting apparatus; and a data receiving apparatus. The data transmitting apparatus includes: a multi-level encoding section for inputting thereto predetermined key information and information data, and for generating a multi-level signal in which a signal level changes so as to be random numbers; and a modulation section for generating a modulated signal in a predetermined modulation format in accordance with the multi-level signal. The multi-level encoding section includes: a first multi-level code generation section for generating, by using the key information, a multi-level code sequence in which a signal level changes so as to be random numbers; and a multi-level processing section for combining the multi-level code sequence and the information data in accordance with predetermined processing, and for generating a multi-level signal having a level corresponding to a combination of the multi-level code sequence and the information data. The first multi-level code generation section includes: a first random number sequence generation section for generating a binary random number sequence by using the key information; and a first multi-level conversion section for generating the multi-level code sequence from the binary random number sequence in accordance with a first encoding rule. The first encoding rule specifies that binary bit sequences respectively having predetermined lengths are caused to correspond to respective multi levels of the multi-level code sequence uniquely, and that the number of digits of different bits (hamming distance) between any adjoining binary bit sequences, which are allocated to arbitrary adjoining multi levels, is equal to the length of each of the binary bit sequences, or equal to a value less than the length of each of the binary bit sequences by 1 bit. The data receiving apparatus includes: a demodulation section for demodulating a modulated signal in a predetermined format and for outputting a multi-level signal; and a multi-level decoding section for inputting thereto predetermined key information and the multi-level signal, and for outputting information data. The multi-level decoding section includes: a second multi-level code generation section for generating, by using the key information, a multi-level code sequence in which a signal level changes so as to be random numbers; and a multi-level decision section for deciding the multi-level signal in accordance with the multi-level code sequence, and for outputting the information data. The second multi-level code generation section includes: a second random number sequence generation section for generating a binary random number sequence by using the key information; and a second multi-level conversion section for generating the multi-level code sequence from the binary random number sequence in accordance with a second encoding rule. The second encoding rule specifies that binary bit sequences respectively having predetermined lengths are caused to correspond to respective multi levels of the multi-level code sequence uniquely, and that the number of digits of different bits (hamming distance) between any adjoining binary bit sequences, which are allocated to arbitrary adjoining multi levels, is equal to the length of each of the binary bit sequences, or to a value less than the length of each of the binary bit sequences by 1 bit.

Preferably, the first multi-level code generation section further includes an interleaving section for performing a bit interleaving, which has a predetermined depth, on the binary random number sequence generated by the first random number sequence generation section. The second multi-level code generation section further includes an interleaving section for performing the bit interleaving, of the predetermined depth, on the binary random number sequence generated by the second random number sequence generation section.

Further, the present invention is also directed to a multi-level code generation apparatus for performing cipher communication. To attain the above-described object, the multi-level code generation apparatus of the present invention comprises: a random number sequence generation section for generating a binary random number sequence by using predetermined key information; and a multi-level conversion section for generating a multi-level code sequence from the binary random number sequence in accordance with a predetermined encoding rule. The predetermined encoding rule specifies that binary bit sequences respectively having predetermined lengths are caused to correspond to respective multi levels of the multi-level code sequence uniquely, and that the number of digits of different bits (hamming distance) between any adjoining binary bit sequences, which are allocated to arbitrary adjoining multi levels, is equal to the length of each of the binary bit sequences, or equal to a value less than the length of each of the binary bit sequences by 1 bit.

Preferably, the multi-level code generation section further includes an interleaving section for performing a bit interleaving, which has a predetermined depth, on the binary random number sequence generated by the random number sequence generation section.

Preferably, the number of columns of the bit interleaving is equal to or more than twice a degree of linear complexity of the binary random number sequence generated by the random number sequence generation section. In addition, the number of rows of the bit, interleaving is equal to or more than the length of each binary bit sequence allocated to each multi level.

Preferably, the length of each binary bit sequence caused to correspond to each multi level is equal to or more than 2. In addition, the total number of the multi levels is equal to a power of 2. Further in addition, the binary bit sequences having lengths identical to one another are allocated to all the multi levels. Still, further in addition, the multi levels are each represented by any one of an amplitude, a frequency, and a phase, or by any combination selected from thereamong.

Effect of the Invention

According to the data communication apparatus of the present invention, the information data is encoded/modulated by using key information to generate a multi-level signal, and the received multi-level signal is decoded/demodulated by using the same key information. A signal-to-noise power ratio of the multi-level signal is corrected appropriately, whereby time necessary to analyze cipher text is significantly increased, and a highly concealable data communication apparatus can be provided.

Further, a hamming distance between binary bit sequences, which are allocated to adjoining two multi levels, is increased, whereby an increased number of errors are induced to occur in the binary random number sequences received by the eavesdropper. Accordingly, it becomes significantly difficult for the eavesdropper to identify initial values (i.e., key information) necessary to generate the binary random number sequences, whereby high concealability can be ensured even when the number of multi levels of the multi-level signal is relatively small.

BRIEF DESCRIPTION OF THE DRAWINGS

FIG. 9 is a block diagram showing a configuration of a first multi-level code generation section 156a.

FIG. 14 is a block diagram showing an exemplary configuration of a code conversion section 1582.

FIG. 16 is a block diagram showing a configuration of a first multi-level code generation section 166a.

FIG. 20 is a block diagram showing a configuration of a conventional data transmitting apparatus.

Figure 1:
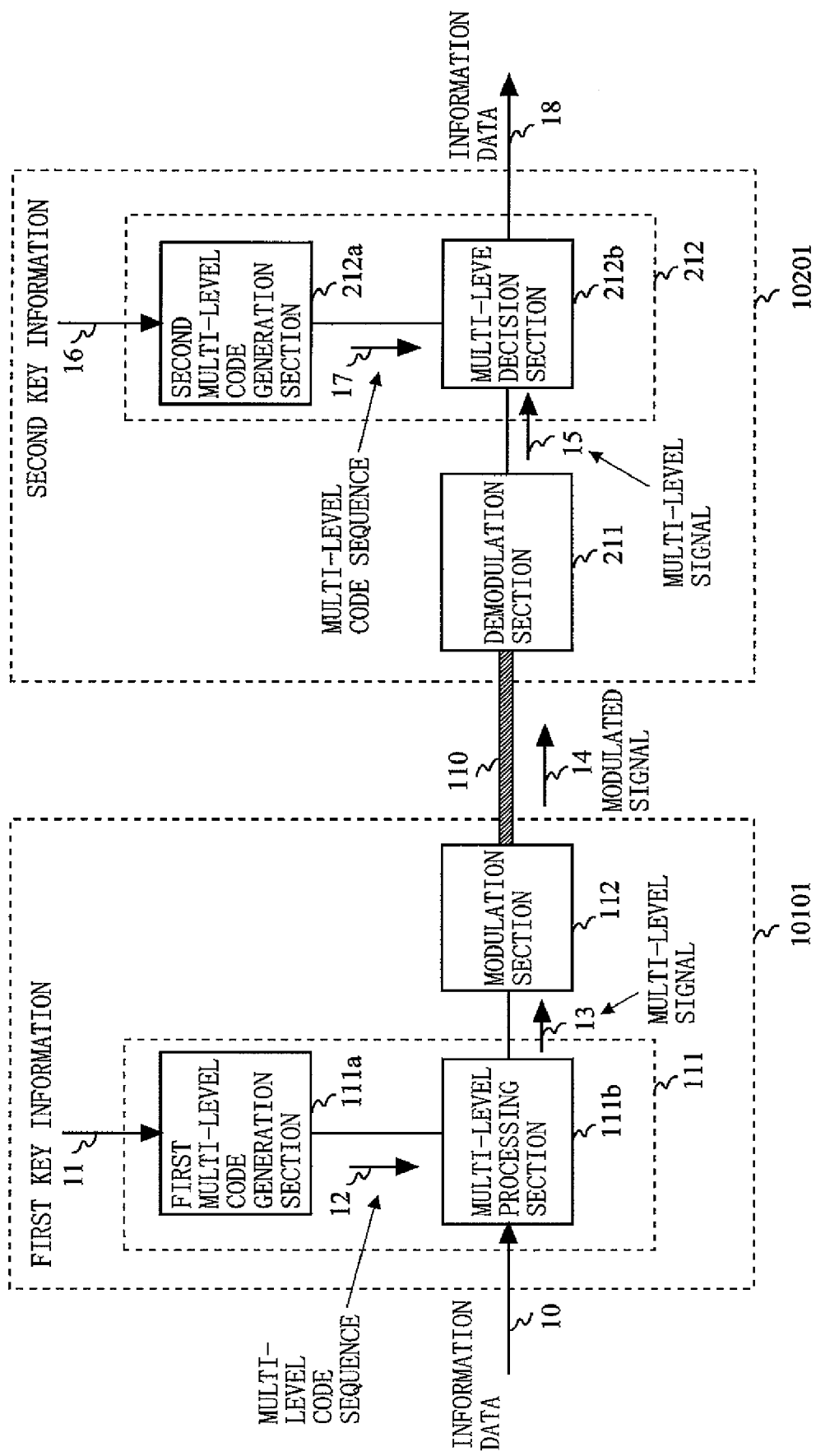
FIG. 1 is a block diagram showing a configuration of a data communication apparatus according to a first embodiment of the present invention.

DESCRIPTION OF THE REFERENCE CHARACTERS 10101, 10102, 10103, 10105, 10106 data transmitting apparatus
110 transmission line
111 multi-level encoding section
111a first multi-level code generation section
111b multi-level processing section
112 modulation section
113 first data inversion section
114 noise control section
114a noise generation section
114b combining section
156a, 256a multi-level code generation section
157 random number sequence generation section
158 multi-level conversion section
1581 serial/parallel conversion section
1582 code conversion section
1583 D/A conversion section
166a, 266a multi-level code generation section
167 random number sequence generation section
168 interleaving section
169 multi-level conversion section
10201, 10202, 10205, 10206 data receiving apparatus
211 demodulation section
212 multi-level decoding section
212a second multi-level code generation section
212b multi-level decision section
213 second data inversion section

DETAILED DESCRIPTION OF THE INVENTION

Hereinafter, embodiments of the present invention will be described with reference to diagrams.

First Embodiment

Figure 2:
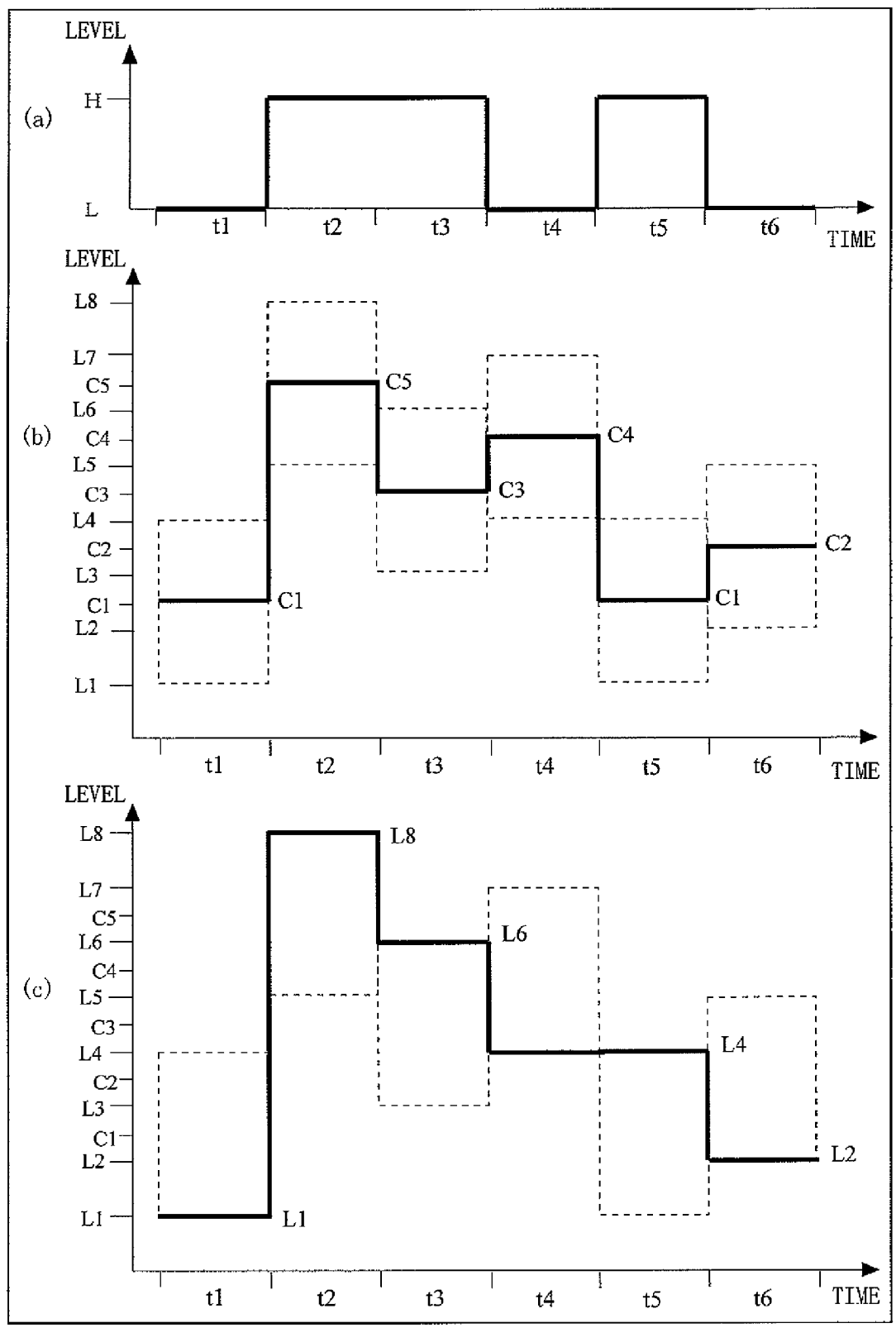
FIG. 2 is a schematic diagram illustrating waveforms of signals transmitted through the data communication apparatus according to the first embodiment of the present invention.
Figure 3:
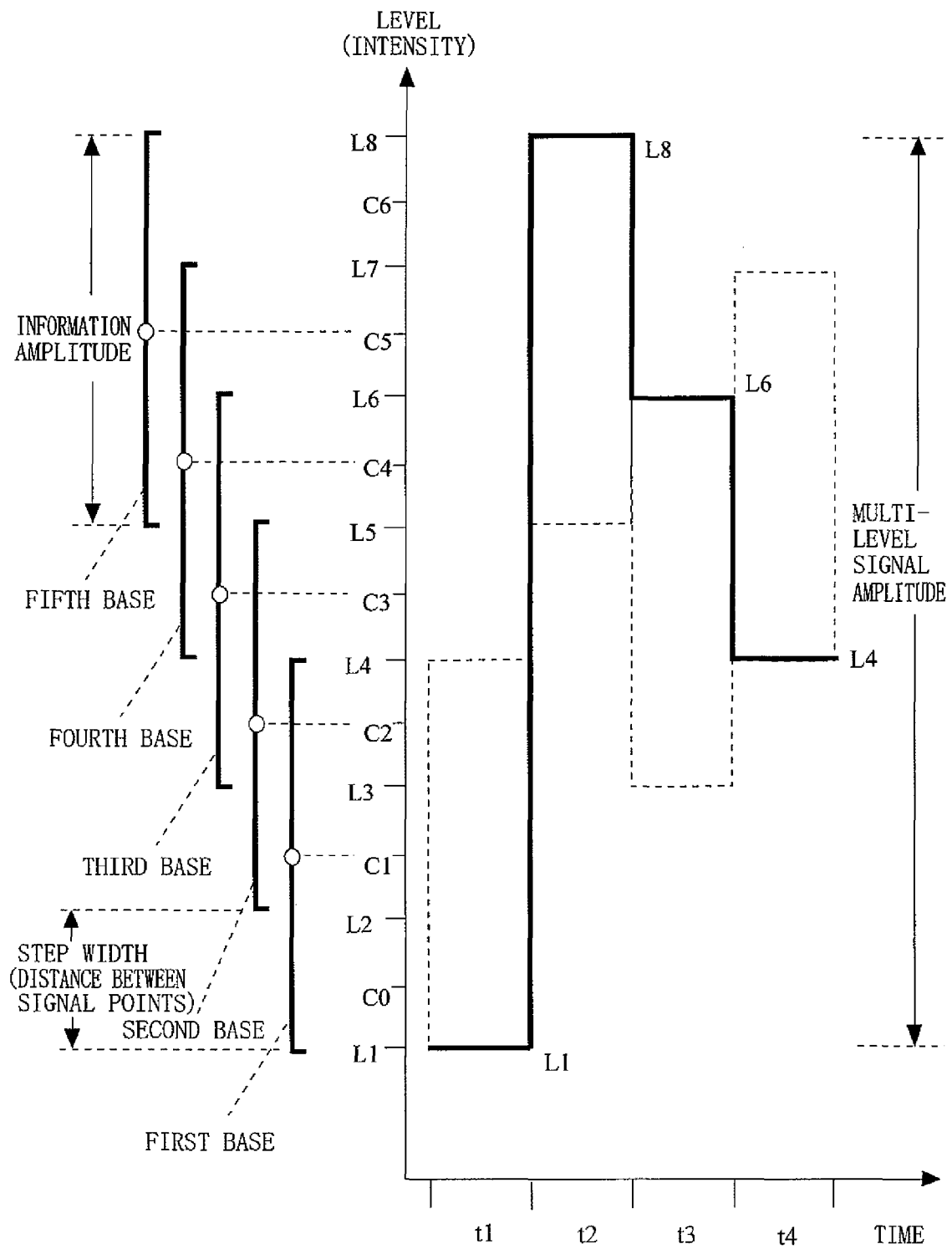
FIG. 3 is a schematic diagram illustrating names of the waveforms of the signals transmitted through the data communication apparatus according to the first embodiment of the present invention.

FIG. 1 is a block diagram showing a configuration of a data communication apparatus according to a first embodiment of the present invention. As shown in FIG. 1, the data communication apparatus is composed of a multi-level encoding section 111, a modulation section 112, a transmission line 110, a demodulation section 211, and a multi-level decoding section 212. The multi-level encoding section 111 is composed of a first multi-level code generation section 111a and a multi-level processing section 111b. The multi-level decoding section 212 is composed of a second multi-level code generation section 212a and a multi-level decision section 212b. Further, the multi-level encoding section 111 and modulation section 112 compose a data transmitting apparatus 10101, and the demodulation section 211 and the multi-level decoding section 212 compose a data receiving apparatus 10201. As the transmission line 110, a metal line such as a LAN cable or a coaxial line, or an optical waveguide such as an optical-fiber cable may be used. Further, as the transmission line 110, not only a wired cable such as the LAN cable, but also free space capable of transmitting a wireless signal may be used. FIGS. 2 and 3 are each a schematic diagram showing waveforms of modulated signals outputted from the modulation section 112. Hereinafter, an operation of the data transmission apparatus will be described with reference to FIGS. 2 and 3.

The first multi-level code generation section 111a generates a multi-level code sequence 12 (FIG. 2(b)), in which a signal level changes so as to be approximately random numbers, by using predetermined first key information 11. The multi-level processing section 111b inputs thereto a multi-level code sequence 12 and information data 10 (FIG. 2(a)) so as to combine both of the signals in accordance with a predetermined procedure, and then generates and outputs a multi-level signal 13 (FIG. 2(c)) which has a level corresponding to a combination of the signal level of the multi-level code sequence 12 and that of the information data 10. For example, in FIG. 2, with respect to time slots t1/t2/t3/t4, the level of the multi-level code sequence 12 changes to c1/c5/c3/c4, and the information data 10 is added to the aforementioned level, which is used as a bias level, whereby the multi-level signal 13 which changes to L1/L8/L6/L4 is generated. Here, as shown in FIG. 3, an amplitude of the information data 10 is referred to as an "information amplitude", a whole amplitude of the multi-level signal 13 is referred to as a "multi-level signal amplitude", pairs of levels (L1, L4)/(L2, L5)/(L3, L6)/(L4, L7)/(L5, L8), which may be taken by the multi-level signal 13 with respect to respective bias levels (levels of the multi-level code sequence 12) c1/c2/c3/c4/c5, are referred to as first to fifth "bases", and a minimum distance between two signal points of the multi-level signal 13 is referred to as a "step width". The modulation section 112 converts the multi-level signal 13, which is original data, into a modulated signal 14 in a predetermined modulation format, and transmits the same to the transmission line 110.

The demodulation section 211 demodulates the modulated signal 14 transmitted via the transmission line 110, and reproduces a multi-level signal 15. The second multi-level code generation section 212a previously shares second key information 16 which is identical to first key information 11, and generates, by using the second key information 16, a multi-level code sequence 17 which is equivalent to the multi-level code sequence 12. The multi-level decision section 212b uses the multi-level code sequence 17 as a threshold value, performs decisions (binary decisions) on the multi-level signal 15, and then reproduces information data 18. The modulated signal 14 in the predetermined modulation format, which is transmitted between the modulation section 112 and the demodulation section 211 via the transmission line 110, is obtained by modulating an electromagnetic wave (electromagnetic field) or an optical wave using the multi-level signal 13.

Regarding a method for generating the multi-level signal 13 in the multi-level processing section 111b, in addition to a method based on the above-described adding processing between the multi-level code sequence 12 and the information data 10, any method may be applicable such as a method in which the level of multi-level code sequence 12 is amplitude-modulated/controlled in accordance with the information data 10, and a method in which the level of the multi-level signal 13, which corresponds to a combination of the level of the multi-level code sequence 12 and that of the information data 10, is previously stored in a memory and consecutively read from the memory in accordance with the combination of the levels.

In FIGS. 2 and 3, the number of multi levels of the multi-level signal is described as "8", and may be greater or lower than this, instead. The information amplitude is described as three times or integer times the step width of the multi-level signal, but may be any odd number times or even number times. Further, the information amplitude is not necessarily integer times the step width of the multi-level signal. Still further, in relation to this, in FIGS. 2 and 3, the levels (bias level) of the multi-level code sequence are each located approximately at a central part between the pair of levels of the multi-level signal. However, each level of the multi-level code sequence is not necessarily located substantially at the central part between the pair of levels of the multi-level signal, or alternatively, may correspond to each level of the multi-level signal. Further the description is based on the assumption that the multi-level code sequence and the information data are identical in a change rate to each other and also in a synchronous relation. However, instead of this, the change rate of either thereof may be faster (or slower) than that of the other. Further, the multi-level code sequence and the information data may be in an asynchronous relation.

Next, eavesdropping of the modulated signal by a third party will be described. It is assumed that the third party receives and decodes the modulated signal by using a data receiving apparatus (e.g., eavesdropper data receiving apparatus) which has a configuration corresponding to that of the data receiving apparatus 10201 held by a legitimate receiving party, or which is more sophisticated. In the eavesdropper data receiving apparatus, a demodulation section (eavesdropper demodulation section) demodulates the modulated signal, thereby reproducing the multi-level signal. However, the multi-level decoding section (eavesdropper multi-level decoding section) does not share the first key information 11 with the data transmitting apparatus 10101, and thus, unlike the data receiving apparatus 10201, cannot perform binary decision of the multi-level signal by using the multi-level code sequence, which is generated based on the key information, as a reference. As an eavesdropping method possibly performed in such a case, a method for simultaneously performing decisions on all the levels of the multi-level signal (general referred to as an "all-possible attack") may be considered. That is, the eavesdropper performs simultaneous decision by preparing threshold values corresponding to respective distances between signal points possibly taken by the multi-level signal, analyzes a result of the decision, and then extracts correct key information or correct information data. For example, the eavesdropper uses the levels c0/c1/c2/c3/c4/c5/c6 of the multi-level code sequence shown in FIG. 2 as the threshold values, performs multi-level decisions on the multi-level signal, and then identifies the levels of the multi-level signal.

Figure 4:
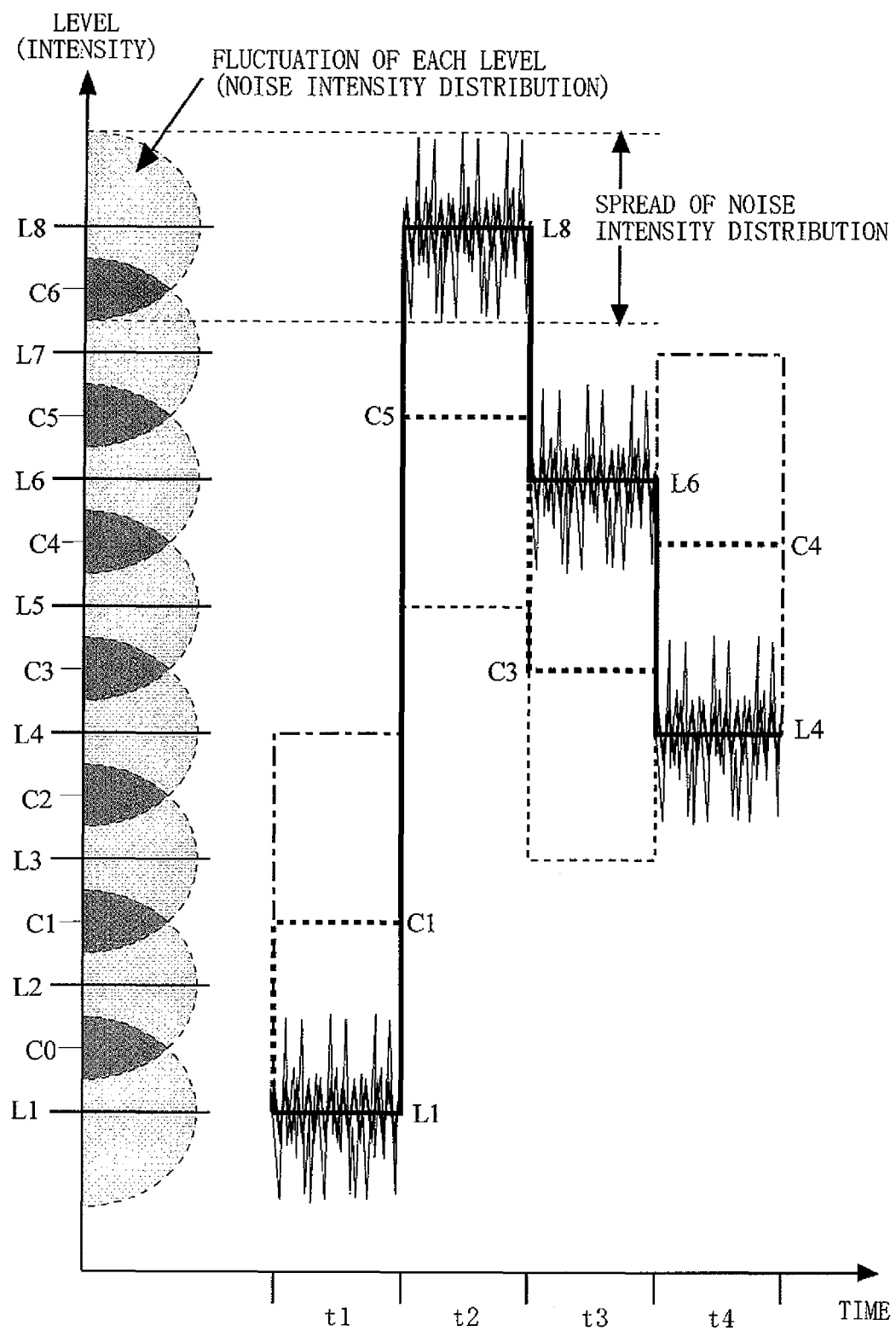
FIG. 4 is a schematic diagram illustrating quality of the signals transmitted through the data communication apparatus according to the first embodiment of the present invention.

However, in an actual transmission system, a noise is generated due to various factors, and is overlapped on the modulated signal, whereby the level of the multi-level signal fluctuates temporally/instantaneously as shown in FIG. 4. In this case, an SN ratio (a signal-to-noise intensity ratio) of a signal-to-be-decided based on binary decision by the legitimate receiving party (the data receiving apparatus 10201) is determined based on a ratio between the information amplitude of the multi-level signal and a noise level included therein. On the other hand, the SN ratio of the signal-to-be-decided based on the multi-level decision by the eavesdropper data receiving apparatus is determined based on a ratio between the step width of the multi-level signal and the noise level included therein. Therefore, in the case where a condition of the noise level included in the signal-to-be-decided is fixed, the SN ratio of the signal-to-be-decided by the eavesdropper data receiving apparatus becomes relatively small, and thus a transmission feature (an error rate) deteriorates. That is, it is possible to induce a decision error in the all-possible attacks performed by the third party using all the thresholds, and to cause the eavesdropping to become difficult. Particularly, in the case where the step width of the multi-level signal 15 is set at an order equal to or less than a noise amplitude (spread of a noise intensity distribution), the multi-level decision by the third party is substantially disabled, and a preferable eavesdropping prevention can be realized.

As the above-described noise overlapped on the signal-to-be-decided (the multi-level signal or the modulated signal), a thermal noise (Gaussian noise) included in a space field or an electronic device, etc. may be used, when an electromagnetic wave such as a wireless signal is used as the modulated signal, whereas a photon number fluctuation (quantum noise) at the time when the photon is generated may be used in addition to the thermal noise, when the optical wave is used. Particularly, signal processing such as recording and replication is not applicable to a signal using the quantum noise, and thus the step width of the multi-level signal is set by using the level of the noise as a reference, whereby the eavesdropping by the third party is disabled and security of the data communication is ensured.

As above described, according to the present embodiment, the information data to be transmitted is encoded as the multi-level signal, and the distance between the signal points is set appropriately with respect to the noise level, whereby quality of the receiving signal at the time of the eavesdropping by the third party is crucially deteriorated. Accordingly, it is possible to provide a further safe data communication apparatus which causes decryption/decoding of the multi-level signal by the third party to become difficult.

Second Embodiment

Figure 5:
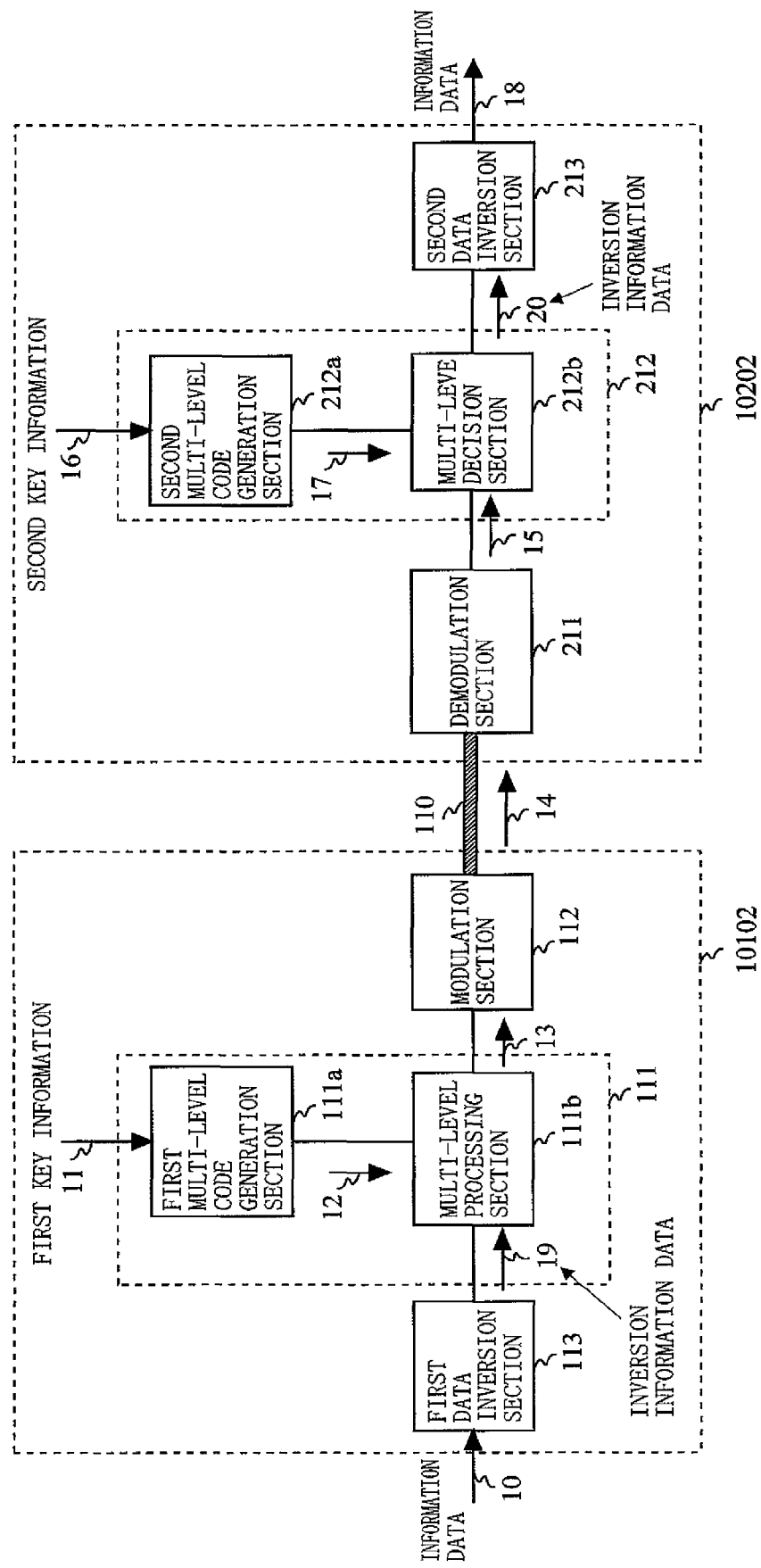
FIG. 5 is a block diagram showing a configuration of a data communication apparatus according to a second embodiment of the present invention.

FIG. 5 is a block diagram showing a configuration of a data communication apparatus according to a second embodiment of the present invention. As shown in the diagram, the data communication apparatus includes the multi-level encoding section 111, the modulation section 112, the transmission line 110, the demodulation section 211, the multi-level decoding section 212, a first data inversion section 113, and a second data inversion section 213, and is different from the configuration shown in FIG. 1 in that the first data inversion section 113 and the second data inversion section 213 are additionally provided thereto. A data transmitting apparatus 10102 is composed of the multi-level encoding section 111, the modulation section 112, and the first data inversion section 113, whereas a data receiving apparatus 10202 is composed of the demodulation section 211, the multi-level decoding section 212, and the second data inversion section 213. Hereinafter, an operation of the data communication apparatus according to the present embodiment will be described.

Since the configuration of the present embodiment corresponds to that of the first embodiment (FIG. 1), those functional blocks which perform common operations are provided with common reference characters, and descriptions thereof will be omitted. Only different points will be described. In the configuration, the first data inversion section 113 does not have a fixed correspondence relation between information composed of "0" and "1" contained in the information data and levels composed of a Low level and a High level, and instead, the correspondence relation changes approximately randomly in accordance with a predetermined procedure. For example, in the same manner as the multi-level encoding section 111, an Exclusive OR (XOR) operation between the information data and a random number series (pseudo random number sequence), which is generated based on a predetermined initial value, is performed, and a result of the operation is outputted to the multi-level encoding section 111. In a manner reverse to that performed by the first data inversion section 113, the second data inversion section 213 changes the correspondence relation between the information composed of "0" and "1" contained in data outputted from the multi-level decoding section 212 and the levels composed of the Low level and the High level. For example, the second data inversion section 213 has an initial value, which is identical to an initial value included in the first data inversion section 113, in a shared manner, performs the XOR operation between a bit inverted random number series, the random number series being generated based on the initial value, and the data outputted from the multi-level encoding section 212, and then outputs the resultant as the information data.

As above described, according to the present embodiment, information data to be transmitted is inverted approximately randomly, whereby complexity of the multi-level signal as a secret code is increased. Accordingly, decryption/decoding by a third party is caused to become further difficult, and a further safe data communication apparatus may be provided.

Third Embodiment

Figure 6:
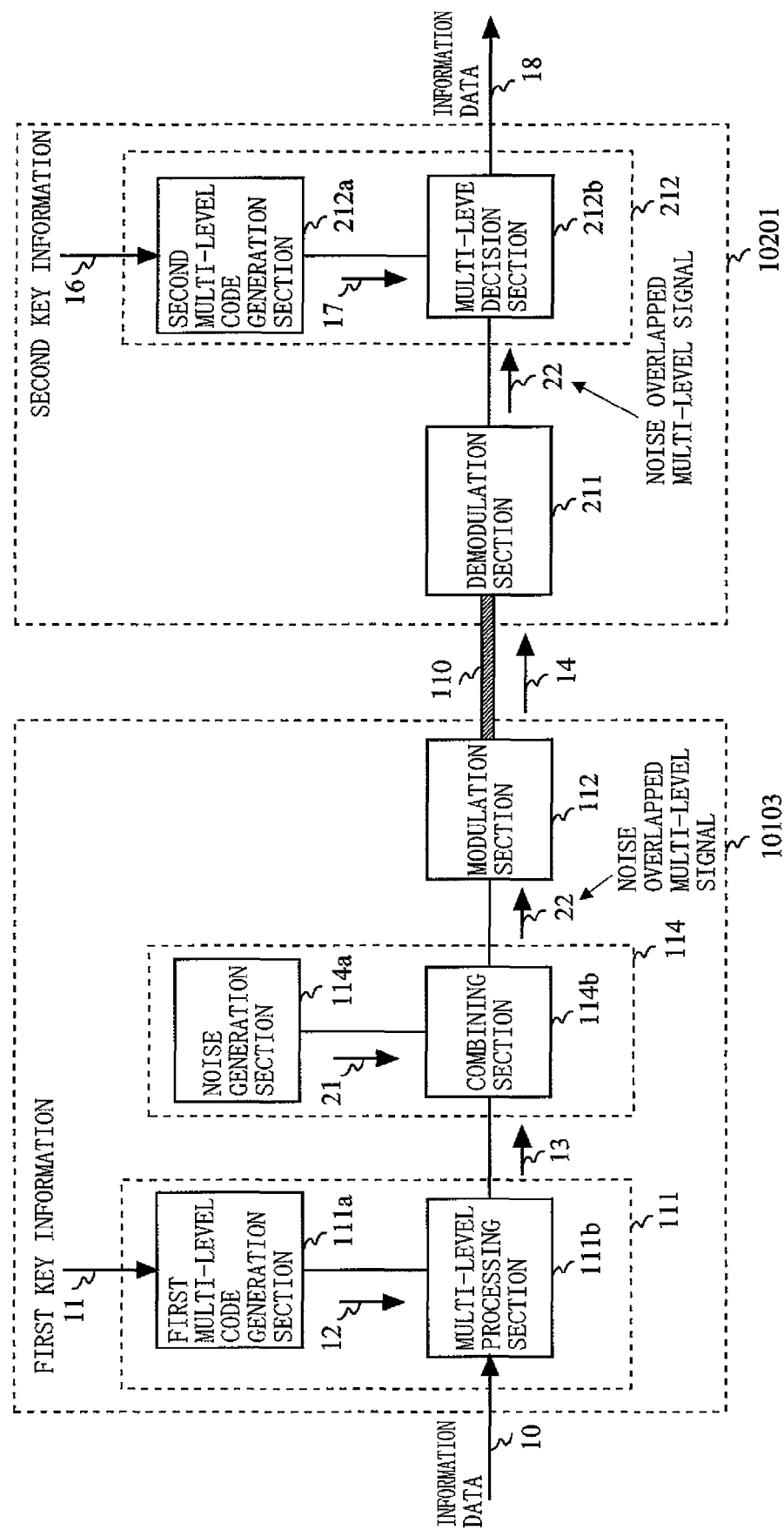
FIG. 6 is a block diagram showing a configuration of a data communication apparatus according to a third embodiment of the present invention.

FIG. 6 is a block diagram showing a configuration of a data communication apparatus according to a third embodiment of the present invention. As shown in FIG. 6, the data communication apparatus includes the multi-level encoding section 111, the modulation section 112, the transmission line 110, the demodulation section 211, the multi-level decoding section 212, and a noise control section 114, and is different from the configuration shown in FIG. 1 in that the noise control section 114 is additionally included. Further, the noise control section 114 is composed of a noise generation section 114a and a combining section 114b. A data transmitting apparatus 10103 is composed of the multi-level encoding section 111, the modulation section 112, and the noise control section 114, whereas the data receiving apparatus 10201 is composed of the demodulation section 211 and the multi-level decoding section 212. Hereinafter, an operation of the data transmitting apparatus will be described.

Since the configuration of the present embodiment corresponds to that of the first embodiment (FIG. 1), those functional blocks which perform operations identical to those of the first embodiment are provided with common reference characters, and descriptions thereof will be omitted. Only different points will be described. In the noise control section 114, the noise generation section 114a generates a predetermined noise. The combining section 114b combines the predetermined noise and the multi-level signal 13, and outputs the combined signal to the modulation section 112. That is, the noise control section 114 purposely causes a level fluctuation in the multi-level signal illustrated in FIG. 4, controls the SN ratio of the multi-level signal so as to be an arbitrary value, and then controls the SN ratio of a signal-to-be-decided which is inputted to the multi-level decision section 212b. As above described, as the noise generated in the noise generation section 114a, the thermal noise, quantum noise and the like are used. Further, the multi-level signal on which the noise is combined (overlapped) will be referred to as a noise-overlapped multi-level signal 22.

As above described, according to the present embodiment, information data to be transmitted is encoded as the multi-level signal, and the SN ratio thereof is controlled arbitrarily, whereby quality of a received signal at the time of eavesdropping by a third party is deteriorated crucially. Accordingly, it is possible to provide a further safe data communication apparatus which causes decryption/decoding of the multi-level signal by the third party to become difficult.

Fourth Embodiment

Figure 7:
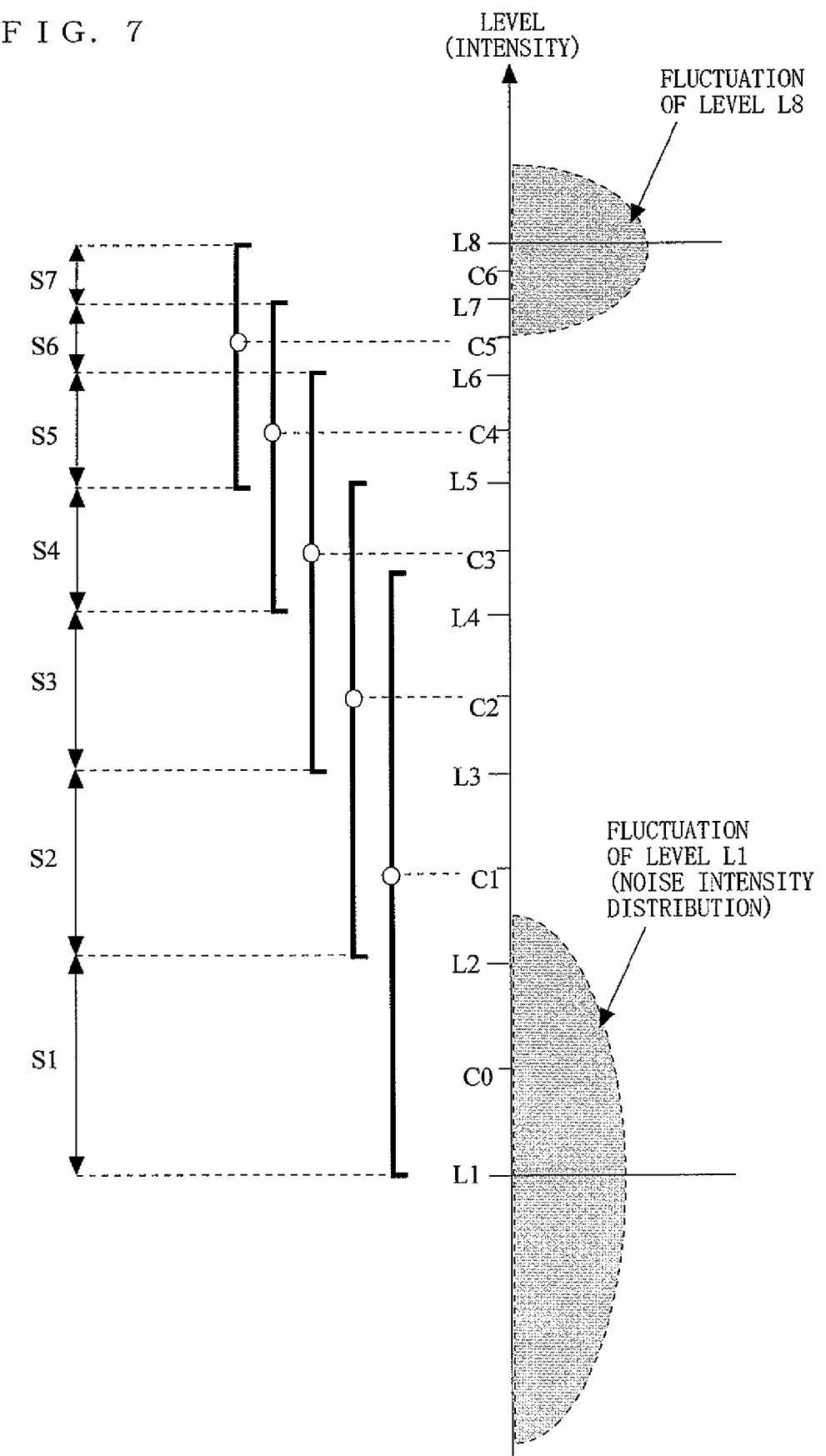
FIG. 7 is a schematic diagram illustrating parameters of signals transmitted through a data communication apparatus according to a fourth embodiment of the present invention.

An operation of a data communication apparatus according to a fourth embodiment of the present invention will be described. Since a configuration of the present embodiment corresponds to that of the first embodiment (FIG. 1) or the third embodiment (FIG. 6), a block diagram thereof will be omitted. In the fourth embodiment, as shown in FIG. 7, the multi-level encoding section 111 sets respective step widths (S1 to S7) between the respective levels of the multi-level signal in accordance with fluctuation ranges of the respective levels, i.e., noise intensity distributions overlapped on the respective levels. Specifically, distances between adjoining two signals points are allocated such that the respective SN ratios are substantially equal to one another, each of the SN ratios being determined between the adjoining two signal points of a signal-to-be-decided which is inputted to the multi-level decision section 212b. When noise levels to be overlapped on the respective levels of the multi-level signal are equal to one another, the respective step widths are allocated uniformly.

Generally, in the case where an optical intensity modulated signal whose light source is a laser diode (LD) is assumed as a modulated signal, outputted from the modulation section 112, the fluctuation range (noise level) varies depending on the levels of the multi-level signal to be inputted to the LD. This results from the fact that the LD emits light based on the principle of stimulated emission which uses a spontaneous emission light as a "master light", and the noise level is defined based on a relative ratio between a stimulated emission light level and a spontaneous emission light level. The higher an excitation rate (corresponding to a bias current injected to the LD) is, the larger a ratio of the stimulated emission light level becomes, and consequently the noise level becomes small. On the other hand, the lower the excitation rate of the LD is, the larger a ratio of the natural emission light level becomes, and consequently the noise level becomes large. Accordingly, as shown in FIG. 7, in an area in which the level of the multi-level signal is small, the step width is set to be large in a non-linear manner, whereas in an area in which the level thereof is large, the step width is set to be small in a non-linear manner, whereby the SN ratios between the respective adjoining two signal points of the signal-to-be-decided can be made equal to one another.

In the case where a light modulated signal is used as the modulated signal, under the condition where the noise caused by the natural emission light and a thermal noise used for an optical receiving apparatus are sufficiently small, the SN ratio of a received signal is determined mainly based on a shot noise. Under such a condition, the larger the level of the multi-level signal is, the larger the noise level becomes. Accordingly, unlike the case shown in FIG. 7, in the area where the level of the multi-level signal is small, the step width is set to be small, whereas in the area where the level of the multi-level signal is large, the step width is set to be large, whereby the SN ratios between the respective adjoining two signal levels of the signal-to-be-decided can be made equal to one another.

As above described, according to the present embodiment, the information data to be transmitted is encoded as the multi-level signal, and the distances between the respective signal points of the multi-level signal are allocated substantially uniformly. Alternatively, the SN ratios between the respective adjoining signal points are set substantially uniformly regardless of instantaneous levels. Accordingly, the quality of the receiving signal at the time of eavesdropping by a third party is crucially deteriorated all the time, whereby it is possible to provide a further safe data communication apparatus which causes decryption/decoding of the multi-level signal by the third party to become difficult.

Fifth Embodiment

Figure 8:
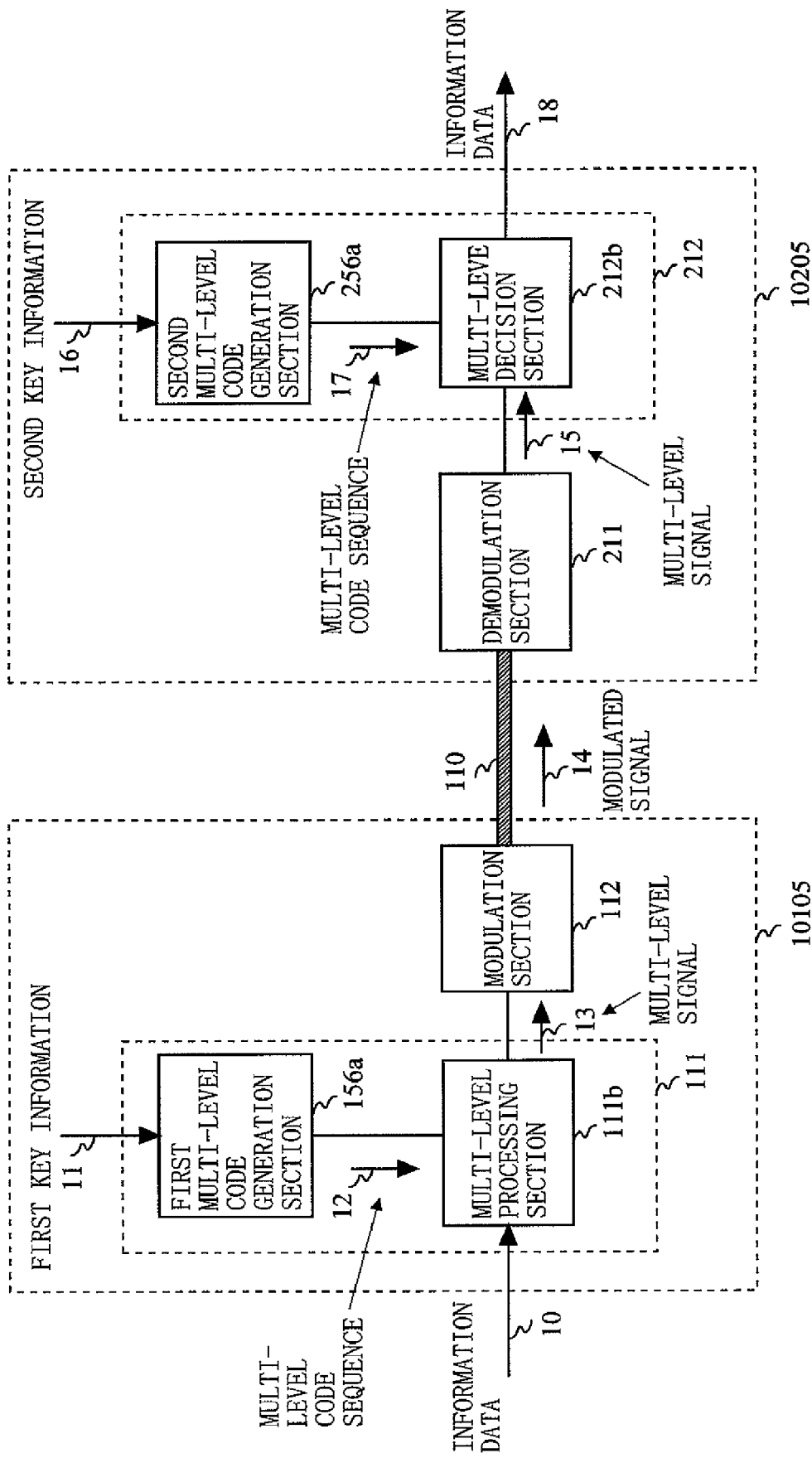
FIG. 8 is a block diagram showing a configuration of a data communication apparatus according to a fifth embodiment of the present invention.

FIG. 8 is a block diagram showing a configuration of a data communication apparatus according to a fifth embodiment of the present invention. As shown in FIG. 8, the data communication apparatus has a configuration in which a data transmitting apparatus 10105 and a data receiving apparatus 10205 are connected to each other via the transmission line 110. The data transmitting apparatus 10105 has a first multi-level code generation section 156a, which differentiates the present embodiment from the first embodiment. The data receiving apparatus 10205 has a second multi-level code generation section 256a, which differentiates the present embodiment from the first embodiment.

Figure 9:
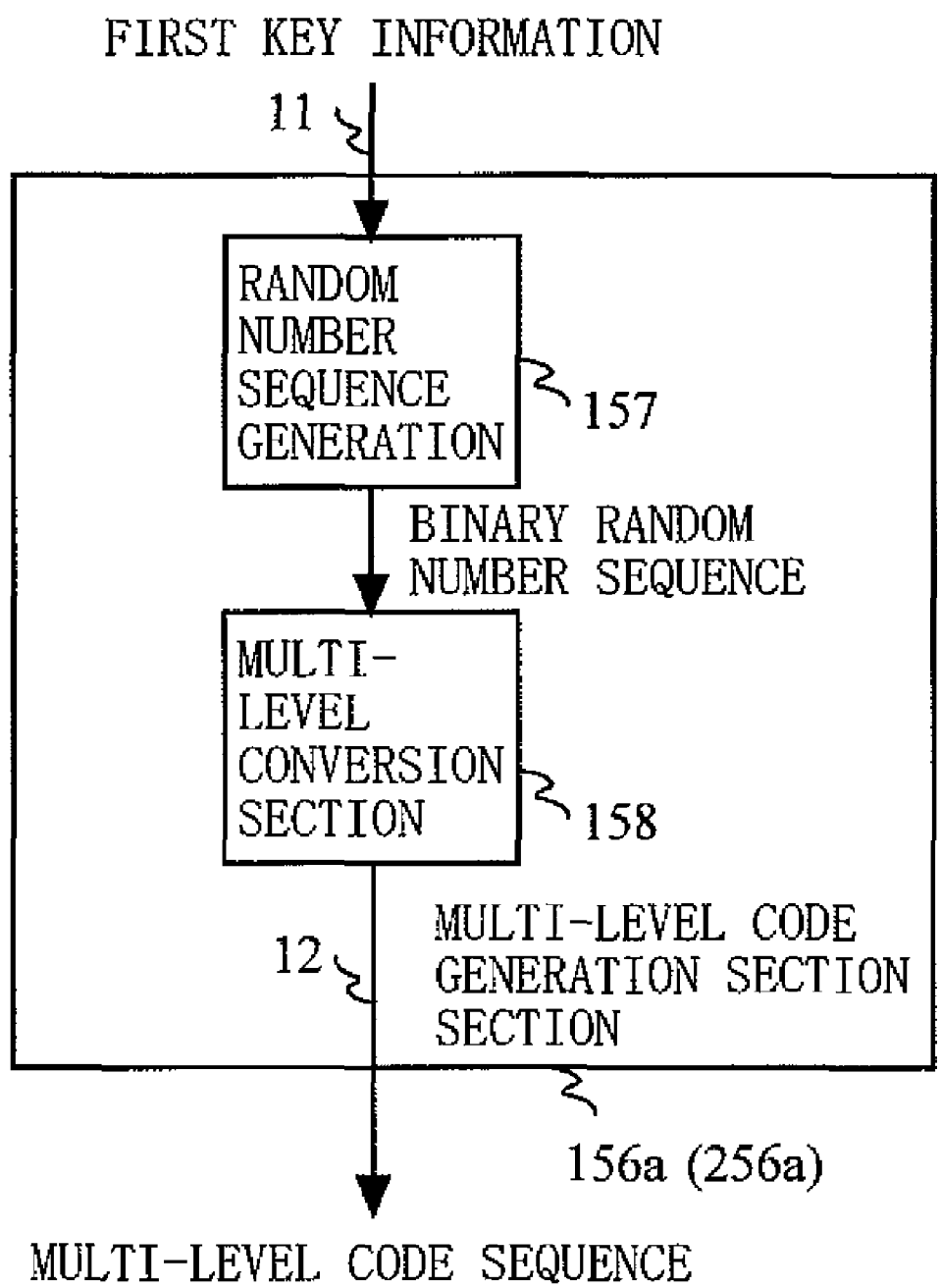

FIG. 9 is a block diagram showing a configuration of the first multi-level code generation section 156a. As shown in FIG. 9, the first multi-level code generation section 156a includes a random number sequence generation section 157 and a first multi-level conversion section 158. The random number sequence generation section 157 generates a binary random number sequence from the first key information 11. The multi-level conversion section 158 converts the binary random number sequence into the multi-level code sequence 12. A configuration of the second multi-level code generation section 256a is the same as that of the first multi-level code generation section 156a.

As one of techniques performed by an eavesdropper for identifying a binary random number sequence generation method, there is an algorithm called a Berlekamp-Massey method (hereinafter abbreviated as a BM method). The technique identifies a generation method of a binary random number sequence from the binary random number sequence which is composed of 2 k bits (k representing a degree of linear complexity of the binary random number sequence) and free from an error. Therefore, in order to prevent the generation method of the binary random number sequence from being identified by using the BM method, it is desirable that a large number of errors are generated discretely in the binary random number sequence to be obtained by the eavesdropper during a decryption process. As an encoding method for realizing such error generation, a multi-level encoding method for increasing the number of errors will be described, first.

Figure 10:
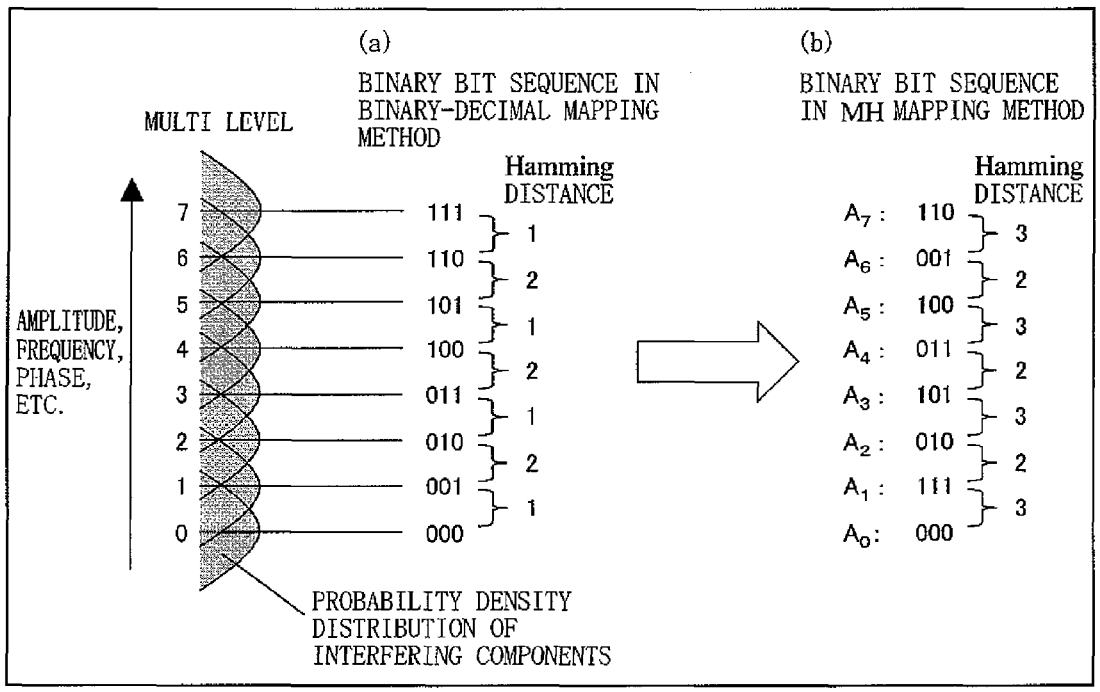
FIG. 10 is a diagram showing an exemplary mapping (allocation) method in which a multi-level conversion section 158 converts a binary random number sequence into an 8-ary multi-level code sequence 12.

FIG. 10 is a diagram showing an exemplary mapping (allocation) method in which the multi-level conversion section 158 converts the binary random number sequence into 8-ary multi-level code sequence 12. FIG. 10(a) shows correspondences between 3-bit binary bit sequences and multi levels in a binary-to-decimal conversion method (hereinafter referred to as a binary-to-decimal encoding method). The multi-level conversion section 158 converts the binary bit sequences "0,0,0", "0,0,1", "0,1,0" . . . into "0", "1", "2" . . . , for example.

Probability density distributions of interference components (such as a Gaussian noise) which are added to the multi levels generally represent distribution profiles each having a peak at each of the multi levels transmitted by a transmitting party, as shown in FIG. 10. A multi-level decision error in the multi levels received by the eavesdropper is most likely to occur in multi levels adjoining to legitimate multi levels. In this case, the number of errors possibly induced in a binary random number sequence obtained by the eavesdropper from the multi-level code sequence 12 is determined depending on a hamming distance (the number of digits having different bits, hereinafter referred to as a hamming distance between adjoining multi levels) between respective two of the binary bit sequences allocated to the respective adjoining multi levels. However, in the binary-to-decimal encoding method, the hamming distance between the adjoining multi levels is likely to be 1 (a minimum value) in most cases, and thus it is impossible to expect that a large number of errors will be induced, in the binary random number sequence, by the decision error of deciding the adjoining multi levels. binary-to-decimal encoding method, the hamming distance between the adjoining multi levels is likely to be 1 (a minimum value) in most cases, and thus it is impossible to expect that a large number of errors are induced, in the binary random number sequence, by the decision error of deciding the adjoining multi levels.

In view of the above-described problem, an error induction effect is enhanced by using a method for maximising the hamming distance between the adjoining multi levels (hereinafter referred to as a Maximized Hamming distance (MH) encoding method). In the MH encoding method shown in FIG. 10(b), the multi levels "0", "1", "2" . . . correspond to the binary bit sequences "0,0,0", "1,1,1", "0,1,0" . . . . With the method, the hamming distance between the adjoining two multi levels becomes "3", which is equivalent to a length of the binary bit sequence allocated to each of the multi levels, or "2" which is less then said "3" by 1. Accordingly, an average hamming distance between the adjoining multi levels can be increased. In this manner, by using the MH encoding method, a large number of errors can foe induced in the binary random number sequence obtained by the eavesdropper, whereby computational complexity required for decryption can be increased.

Subsequently, an algorithm for generating the multi-level code sequence 12 in accordance with the MH encoding method will be described by using the 8-ary multi-level mapping as shown FIG. 10(b) as an example. The method described herein is merely an example, and any method may be applicable as long as such a method is capable of increasing the hamming distance between the adjoining multi levels. Hereinbelow, a binary bit sequences allocated to the multi levels "0", "1", "2" . . . "i" . . . are respectively represented by $A_0, A_1, A_2 \ldots A_i \ldots$.

First of all, a binary bit sequence $A_0$ to be allocated to a multi level "0" will be determined. Although the binary bit sequence to be allocated may be determined arbitrary, $A_0$="0,0,0" is assumed as an example. With respect to a multi level "1", $A_1$ is assumed as "1,1,1" which is obtained by inverting all the values of $A_0$ (="0,0,0"), whereby "3" (a maximum value) is ensured as a hamming distance between $A_1$-$A_0$.

With respect to a multi level "2", in order to maximize a hamming distance between $A_2$-$A_1$, it is preferable to set $A_2$="0,0,0". However, the binary bit sequence is overlapped with $A_0$, another allocation method needs to be considered. Therefore, a bit sequence which is obtained by inverting 2 bits of $A_1$ is allocated to $A_2$ such that the hamming distance between $A_2$-$A_1$ is 2, which is less than the length of the binary bit sequence by 1 bit. As an example, $A_2$"0,1,0" is obtained by inverting the first and the third bits of $A_1$.

Next, with respect to a multi level "3", $A_3$ is set to "1,0,1" by inverting all the values of $A_2$ (="0,1,0"), whereby "3" (the maximum value) is obtained as a hamming distance between $A_3$-$A_2$.

With respect to a multi level "4", it is preferable to set $A_4$="0,1,0" in order to maximize a hamming distance between $A_4$-$A_3$. However, the binary bit sequence is overlapped with $A_2$, another allocation method needs to be considered. Therefore, a bit sequence, which is obtained by inverting 2 bits of $A_3$, is allocated to $A_4$ such that the hamming distance between $A_4$-$A_3$ is 2, which is less than the length of the binary bit sequence by 1 bit. When the first and the third bits of $A_3$ are inverted, the bit series is overlapped with that of $A_0$. Therefore, as an example, $A_4$="1,1,0" is ensured by inverting the second and the third bits of $A_3$.

Next, with respect to a multi level "5", $A_5$ is set to "0,0,1" by inverting all the values of $A_4$ (="1,1,0"), whereby "3" (the maximum value) is obtained as a hamming distance between $A_5$-$A_4$.

With respect to a multi level "6", it is preferable to set $A_6$="1,1,0" in order to maximize a hamming distance between $A_6$-$A_5$. However, the binary bit sequence is overlapped with $A_4$, another allocation method needs to be considered. Therefore, a bit sequence, which is obtained by inverting 2 bits of $A_5$, is allocated to $A_6$ such that the hamming distance between $A_6$-$A_5$ is 2, which is less than the length of the binary bit sequence by 1 bit. As an example, $A_6$="1,0,0" is obtained by inverting the first and the third bits of $A_5$.

Finally, with respect to a multi level "7", $A_7$ is set to "0,1,1" by inverting all the values of $A_6$ (="1,0,0"), whereby "3" (the maximum value) is ensured as a hamming distance between $A_7$-$A_6$.

With the above-described method, the respective binary bit sequences are allocated to the respective multi levels uniquely, such that the hamming distance between adjoining multi levels is equal to "3" of the length of the binary bit sequence, or "2", which is less than the length of the binary bit sequence by 1 bit.

Further, as illustrated in the above-described example, when the lengths of the binary bit sequence allocated to the respective multi levels are identical to each other, and when the number of the multi levels is equal to a power of 2, a method for mapping between the multi levels and the binary bit sequences can be obtained by calculation. Hereinbelow, for the sake of describing the calculation method, an inverting bit matrix and an inverting bit sequence will be defined.

(Equation 1) is a recurrence formula defining a inverting bit matrix $C_i$ ($i$ is a natural number). As shown in (equation 1), the inverting bit, matrix $C_i$ is composed of "i" columns and "$2^i-1$" rows, and is generated based on the recurrence formula. When an initial value $C_1$ of the recurrence formula is 1 and the number of the multi levels of the inverting bit matrix to be obtained is M, the inverting bit matrix is equal to $C_{log\ 2M}$. (Equation 2) shows examples of the inverting bit matrix Ci when i=1, 2, and 3. As shown in (equation 2), when the number of multi levels is 8 (M=8), $C_3$ is calculated based on the above-described recurrence formula. Components of respective rows $B_0, B_1, \ldots B_6$ of the calculated $C_3$ are defined as the inverting bit sequences.

$$C_{n+1} = \begin{bmatrix} 1 \\ \vdots & C_n \\ 1 \\ \hline 0 & 1 & 1 & 1 & \cdots & 1 \\ \hline 1 \\ \vdots & C_n \\ 1 \end{bmatrix}$$ [Equation 1]

$$C_1 = [1]$$ [Equation 2]

$$C_2 = \begin{bmatrix} 1 & 1 \\ 0 & 1 \\ 1 & 1 \end{bmatrix}$$

$$C_3 = \begin{bmatrix} 1 & 1 & 1 \\ 1 & 0 & 1 \\ 1 & 1 & 1 \\ 0 & 1 & 1 \\ 1 & 1 & 1 \\ 1 & 0 & 1 \\ 1 & 1 & 1 \end{bmatrix} = \begin{bmatrix} B_0 \\ B_1 \\ B_2 \\ B_3 \\ B_4 \\ B_5 \\ B_6 \end{bmatrix}$$

Figure 11:
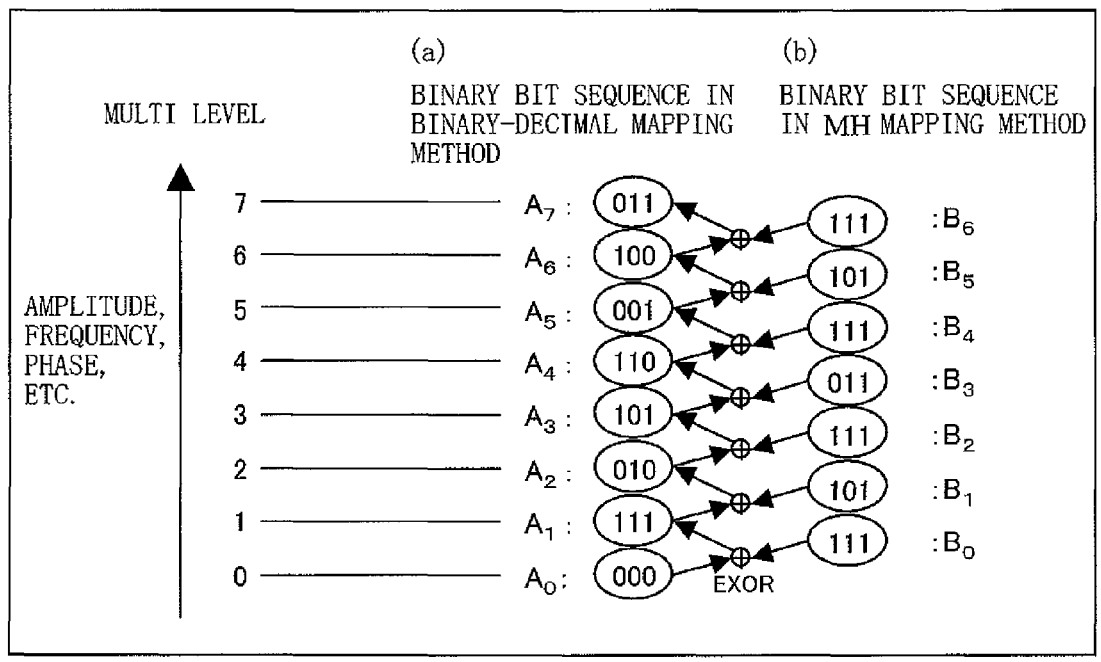
FIG. 11 is a diagram showing a correspondence relation, in an MH encoding method, between binary bit sequences allocated to respective multi levels and inverted bit sequences.

FIG. 11 shows a correspondence relation, in the MH encoding method, between the binary bit sequence allocated to each of the multi levels and the inverting bit sequence. Here, if it is assumed that an EXOR (A, B) represents an XOR operation between a binary bit sequence A and a binary bit sequence B, binary bit sequences $A_0$ to $A_7$ respectively allocated to 8 multi levels are each defined as a relation shown in (equation 3). $A_0$ is set as an initial value, and any arbitrary binary bit sequence may be allocated. For example, when $A_0$="0, 0, 0", a method for mapping the binary bit sequence, the method being similar to that using the MH encoding method, as shown in FIG. 10(b), can be derived.

$$A_i = EXOR(A_i, B_1)$$ [Equation 3]

Based on the above described method, the number of errors in the multi-level decision performed on a binary random number sequence by an eavesdropper may be increased, whereby identification of the binary random number sequence may become complicated.

As an exemplary method for generating the multi-level code sequence 12 in accordance with the above-described MH encoding, considered is a method, for generating the multi-level code sequence 12 from the binary random number sequence, in accordance with the correspondence relation between a binary random number sequence previously stored in a memory or the like and the multi-level code sequence 12. Alternatively, the multi-level conversion section 158 may generate the multi-level code sequence 12 in accordance with a configuration described below.

Figure 12:
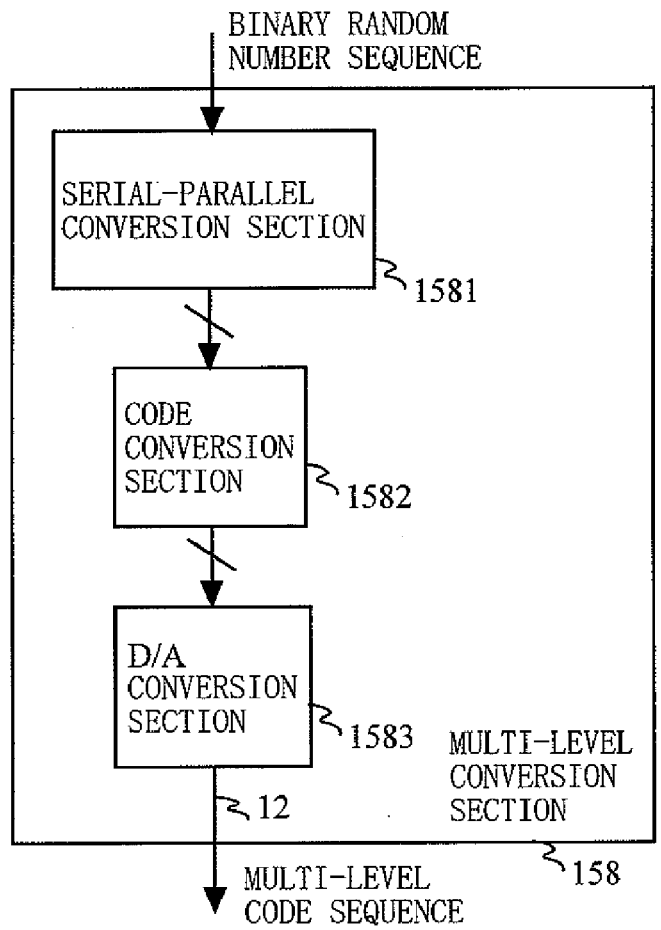
FIG. 12 is a block diagram showing, in detail, an exemplary configuration of the multi-level conversion section 158.
Figure 13:
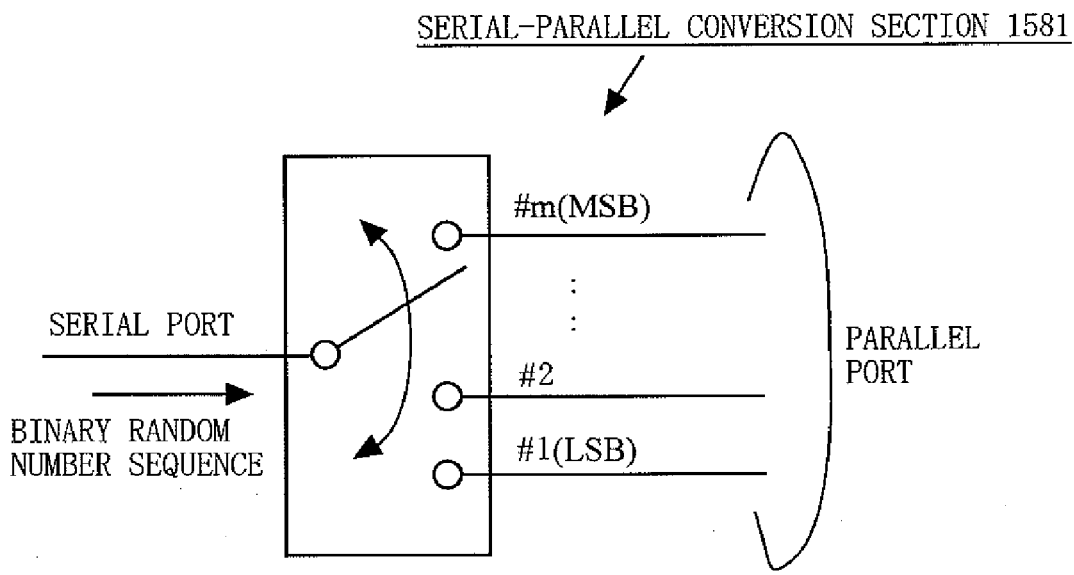
FIG. 13 is a diagram showing, in detail, an exemplary configuration of a serial/parallel conversion section 1581.

FIG. 12 is a block diagram showing, in detail, an exemplary configuration of the multi-level conversion section 158. As shown in FIG. 12, the multi-level conversion section 158 is composed of a serial/parallel conversion section 1581, a code conversion section 1582, and a D/A conversion section 1583. The serial/parallel conversion section 1581 performs serial-parallel conversion of a binary random number sequence, having been inputted thereto, so as to be outputted therefrom. FIG. 13 is diagram showing, in detail, an exemplary configuration of the serial/parallel conversion section 1581. As shown in FIG. 13, for example, the serial/parallel conversion section 1581 outputs the binary random number sequence, which has been inputted to a serial port thereof, to respective parallel ports in sequence, on a bit-by-bit basis, from an LSB side to an MSB side. When a bit has outputted and reached to a parallel port at the MSB side, the serial/parallel conversion section 1581 outputs the subsequent bit to a parallel port at the LSB side. The number of ports "m" of the parallel ports is set to $\log_2 M$ (M is the number of the multi levels of the multi-level code sequence 12). Here, when parallel port numbers #1, #2, . . . and #m are assigned to, in turn, from the parallel port at the LSB side, ith binary random number sequence inputted to the serial port is outputted from the parallel port number #(mod(i−1, m)+1). Note that "mod" (a, b) is a remainder when "a" is divided by "b".

FIG. 14 is a block diagram showing an exemplary configuration of the code conversion section 1582. As shown in FIG. 14, for example, the code conversion section 1582 converts the binary random number sequence, which is inputted to input ports (the number of ports: m), by using EXOR components so as to be outputted from output ports (the number of ports: m). FIG. 14 is exemplified by a case where the number of the multi levels is M=16, and each of the numbers of the input ports and the output ports, i.e., m is 4. Here, it is assumed that a code inputted to an ith input port from the LSB side is $X_i$, and a code outputted from a jth output port from the LSB side is $Y_j$.

In this case, logical operations are performed such that respective relations between inputs $X_1$ to $X_4$ and outputs $Y_1$ to $Y_4$ are represented by $Y_1=X_1$, $Y_2$=EXOR $(X_1, X_2, X_3)$, $Y_3$=EXOR $(X_1, X_3, X_4)$, and $Y_4$=EXOR $(X_1, X_4)$, respectively. The logical operations are generalized, and when the number of multi levels is 2 (the number of ports m=1), $Y_1=X_1$ (without conversion) is satisfied. When the number of multi levels is 4 (the number of ports=2), $Y_1$-$X_1$, and $Y_2$=EXOR $(X_1, X_2)$ are satisfied. When the number of multi levels is equal to a power of 2 and also equal to or more than 8 (the number of ports m≦3), $Y_1=X_1$, $Y_i$=EXOR $(X_1, X_i, X_{i+1})$, and $Y_m$=EXOR $(X_1, X_m)$ are satisfied, where an integer i satisfies 2≦i≦(m−1).

The D/A conversion section 1583 performs a D/A conversion of the code-converted binary random number sequence, and outputs the resultant as the multi-level code sequence 12. For example, the D/A conversion section 1583 has m input ports and 1 output port, and multiplies respective inputs to an ith port from the LSB side by $2^{i-1}$. The multiplied inputs are added together and the resultant is then outputted. According to the above-described configuration, the multi-level conversion section 158 uses the EXOR components, thereby generating a MH code. The method for generating the MH code is not limited to that above described.

As shown in (equation 4), the multi-level conversion section 158 may divide a inverting bit matrix Cn having $(2^n-1)$ rows×n columns into a matrix Cn' having $(2^n-1)$ rows×k columns and a matrix Cn" having $(2^n-1)$ rows×(n−k) columns (k is an arbitrary integer between 1 and (n−1) inclusive), and calculate the inverting bit matrix by using a recurrence formula as shown in (equation 5).

$$C_n = [\underbrace{C'_n}_{K \text{column}} \underbrace{C''_n}_{(n-k) \text{column}}] \}(2^n - 1) \text{ row} \quad [\text{Equation 4}]$$

$$C_{n+1} = \begin{bmatrix} & 1 & \\ C'_n & \vdots & C''_n \\ & 1 & \\ \hline 1 \cdots 1 & 0 & 1 \cdots 1 \\ \hline & 1 & \\ C'_n & \vdots & C''_n \\ & 1 & \end{bmatrix} \quad [\text{Equation 5}]$$

$k \text{column} \quad 1 \text{ column} \quad (n-k) \text{column}$

As above described, according to the present embodiment, the hamming distance between the binary bit sequence allocated to adjoining two multi levels is increased, whereby an increased number of errors can be induced in the binary random number sequence received by the eavesdropper. Therefore, it becomes very complicated for the eavesdropper to identify the initial value (i.e., key information) necessary to generate the binary random number sequence. Accordingly, high concealability can be ensured even when the number of multi levels of the multi-level signal is relatively small.

Sixth Embodiment

In accordance with the method described in the fifth embodiment, the number of errors included in the binary random number sequence obtained by the eavesdropper can be increased. However, in order to prevent decryption based on the BM method or the like, it is preferable not only to increase the number of the errors, but also to disperse the errors.

In the present embodiment, a method for dispersing the errors will be described by using the configuration shown in the first embodiment, and different points from the first embodiment will be mainly focused.

Figure 15:
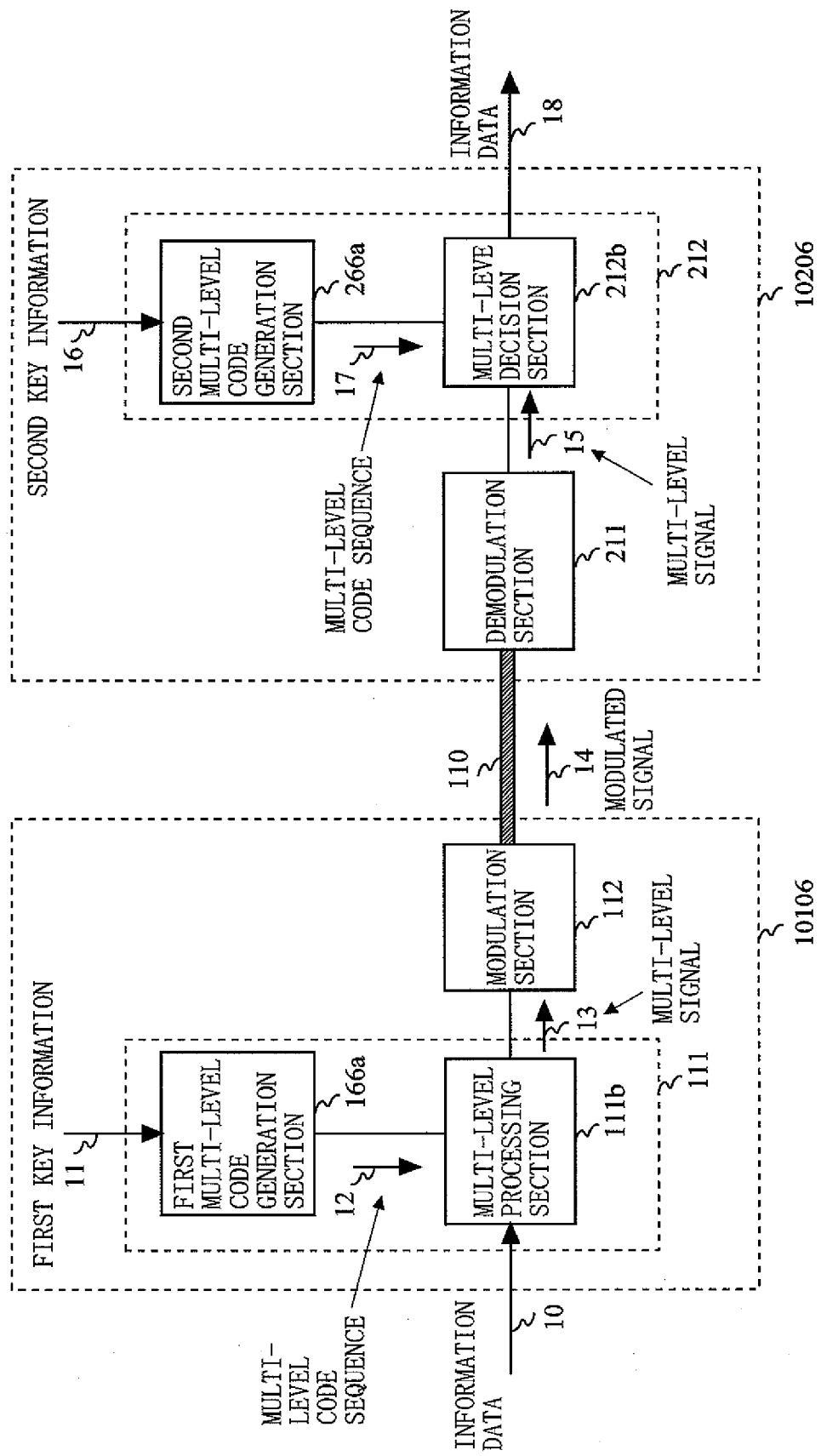
FIG. 15 is a block diagram showing a configuration of a data communication apparatus according to a sixth embodiment of the present invention.

FIG. 15 is a block diagram showing a configuration of a data communication apparatus according to a sixth embodiment of the present invention. As shown in FIG. 15, the data communication apparatus has a configuration in which a data transmitting apparatus 10106 and a data receiving apparatus 10206 are connected to each other via the transmission line 110. A first multi-level code generation section 166a included in the data transmitting apparatus 10106 is different from that according to the first embodiment. A second multi-level code generation section 266a included in the data receiving apparatus 10206 is different from that according to the first embodiment.

Figure 16:
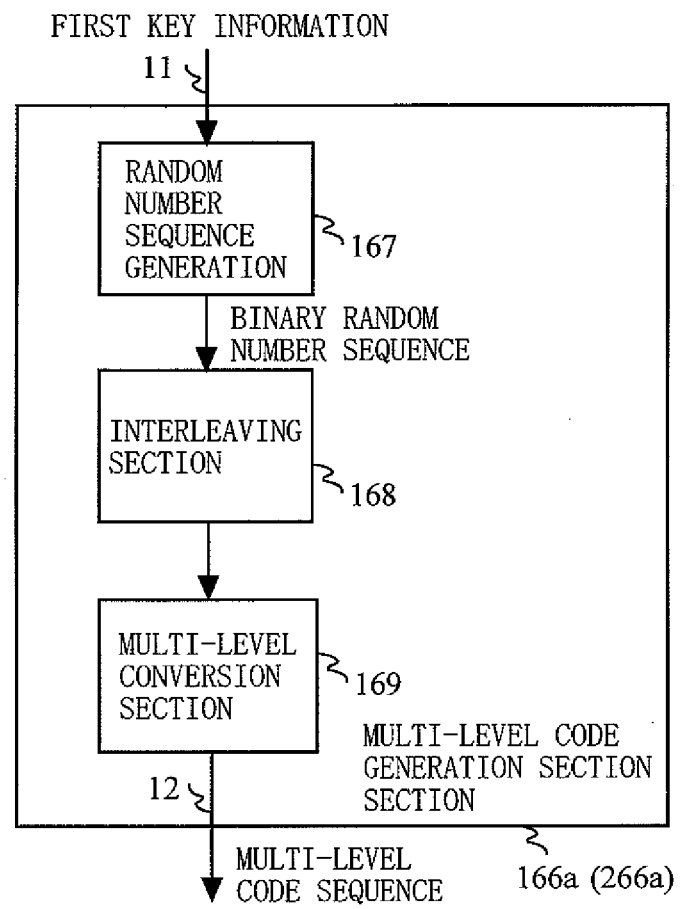

FIG. 16 is a block diagram showing a configuration of the first multi-level code generation section 166a. As shown in FIG. 16, the first multi-level code generation section 166a has a random number sequence generation section 167, an interleaving section 168, and a multi-level conversion section 169. The random number sequence generation section 167 generates a first binary random number sequence by using the first key information 11. The interleaving section 168 performs bit interleaving of the first binary random number sequence, and outputs the resultant as a second binary random number sequence. The multi-level conversion section 169 converts the second binary random number sequence into the multi-level code sequence 12.

In this case, in order to identify the generation method of the random number sequence performed by the random number sequence generation section 167, the eavesdropper needs to convert the multi-level signal 13 into a binary form in accordance with a multi-level encoding method being used, obtain the second binary random number sequence, and then obtain the first binary random number sequence by performing an operation (de-interleaving) which is the reverse of the bit interleaving performed by a transmitting party and a legitimate receiving party using the interleaving section 168.

Figure 17:
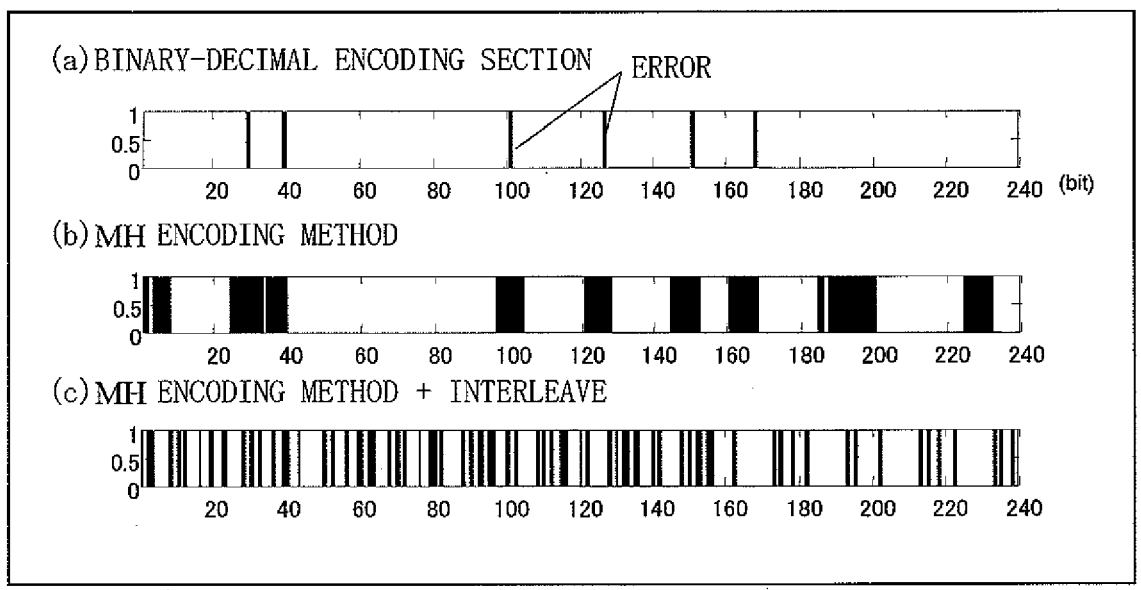
FIG. 17 is a diagram showing an error distribution in the binary random number sequence which is obtained when multi-level decision errors occur in common positions.

FIG. 17 shows error distributions (evaluation examples) in the binary random number sequence, the error distributions being obtained when multi-level decision errors occur at common points in the multi-level signal 13 received by the eavesdropper. With reference to FIG. 17(a), in the case of binary-to-decimal encoding method (without interleaving), the number of errors included in the binary random number sequence is small, and there exist many error-free intervals each having a long duration. Therefore, it is considered that the method for generating the binary random number sequence is likely to be identified quickly by using the BM method or the like. With reference to FIG. 17(b), in the case of the MH encoding method (without interleaving), the number of errors is increased, but the errors are localised. Accordingly, there exist many error-free intervals each having a long duration. Therefore, the method for generating the binary random number sequence is likely to be identified by using the BM method. With reference to FIG. 17(c), in the case where the MH encoding is used in combination with the interleaving described in the present embodiment, the errors localised as shown in FIG. 17(b) are dispersed, and the error-free intervals are decreased significantly. Therefore, with the combined use of the MH encoding and the interleaving, it is possible to enhance resistance to the decryption using the BM method or the like.

Figure 18:
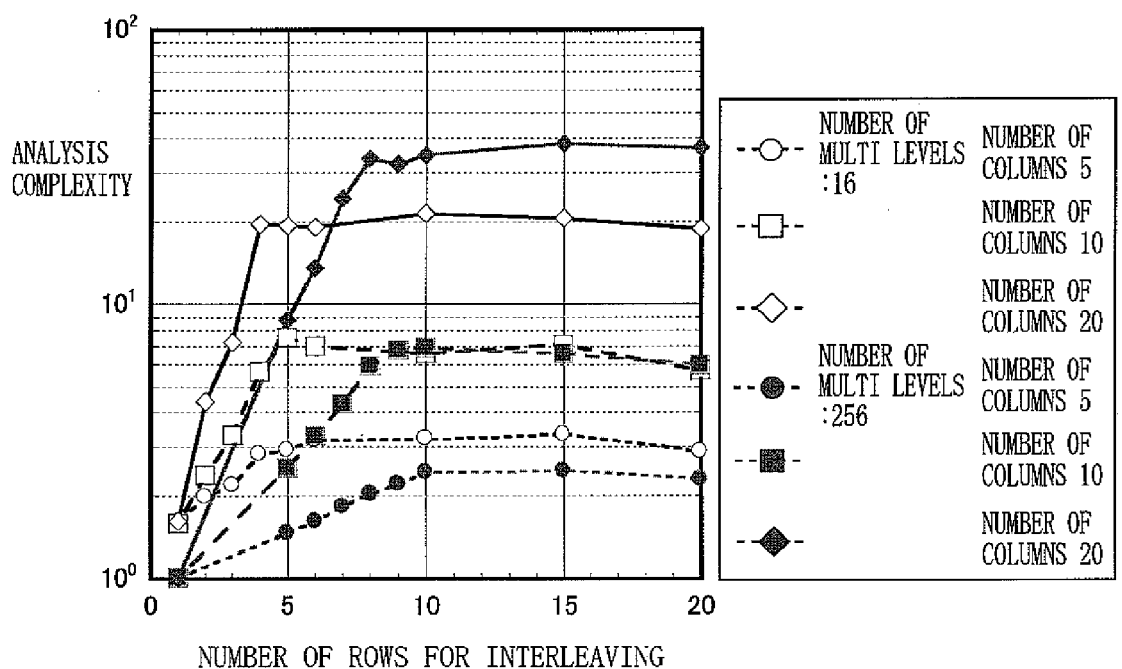
FIG. 18 is a diagram showing a relation between the number of rows for interleaving and decryption complexity.

FIG. 18 is a diagram showing a relation between the number of rows for interleaving and decryption complexity. According to a graph shown in FIG. 18, the required number of receiving bits, in the case where a degree of the linear complexity of the binary random number sequence is 10, the number of the multi levels is 256, and the number of rows for interleaving is 1, is set as a reference, and a ratio of the required number of receiving bits when the number of rows for interleaving is changed is shown as the decryption complexity. As shown in FIG. 18, in the case where the number of the multi levels is 16 (=$2^4$), the decryption complexity is saturated when the number of rows for interleaving is equal to or more than 4, and in the case where the number of the multi levels is 256 (=$2^8$), the decryption complexity is saturated when the number of rows for interleaving is equal to or more than 8. That is, the interleaving section 168 can maximize the decryption complexity when the number of rows for interleaving is set equal to or more than the length of the binary bit sequence, which is allocated to each of the multi levels.

Figure 19:
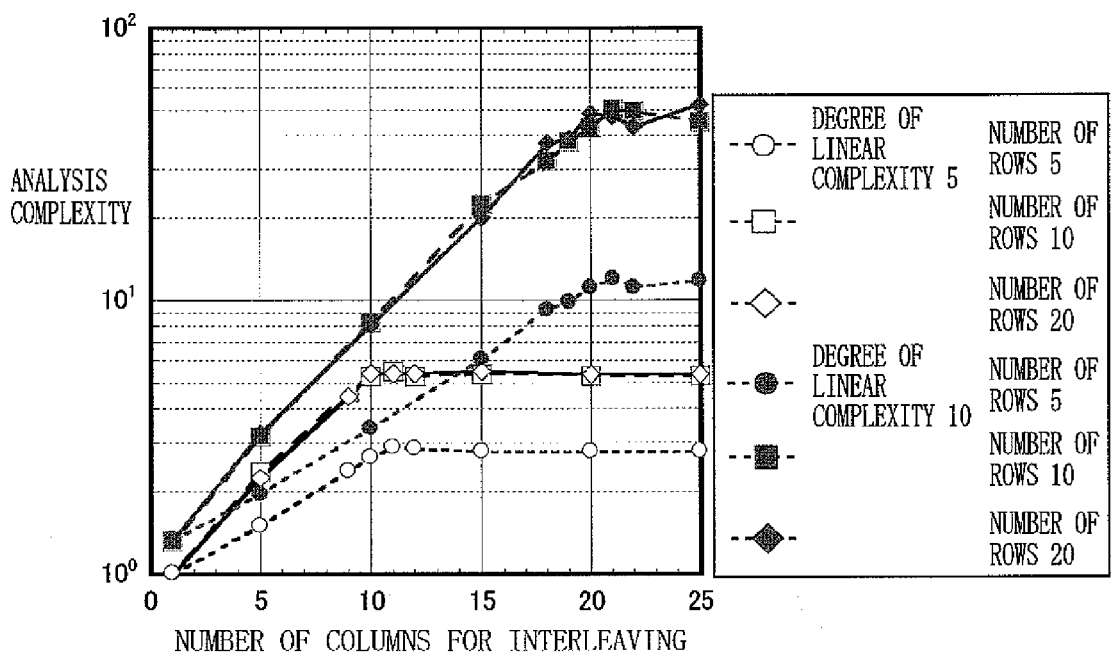
FIG. 19 is a diagram showing a relation between the number of columns for interleaving and the decryption complexity.

FIG. 19 is a diagram showing a relation between the number of columns for interleaving and the decryption complexity. According to a graph shown in FIG. 19, the required number of receiving bits, in the case where the degree of the linear complexity of the binary random number sequence is 5, the number of the multi levels is 256, and the number of interleaving columns is 1, is set as a reference, and a ratio of the required number of receiving bits when the number of columns for interleaving is changed is shown as the decryption complexity. As shown in FIG. 19, in the case where the degree of the linear complexity is 5, the decryption complexity is saturated when the number of columns for interleaving is equal to or more than 10, and in the case where the degree of the linear complexity is 10, the decryption complexity is saturated when the number of columns for interleaving is equal to or more than 20. That is, the interleaving section 168 can maximize the decryption complexity when the number of columns for interleaving is set twice as many as the degree of the linear complexity.

The fifth and sixth embodiments can be applied to the first to fourth embodiments. Further, the data communication apparatus according to each of the first to sixth embodiments may be considered as a method for performing data communication.

INDUSTRIAL APPLICABILITY

The data communication apparatus according to the present invention is useful for secret communication apparatus or the like which is safe against eavesdropping/interception.

The invention claimed is:

1. A data transmitting apparatus for performing cipher communication, the data transmitting apparatus comprising:
   a memory;
   a multi-level encoding section for receiving predetermined key information and information data, and for generating a multi-level signal in which a signal level changes so as to be approximately random numbers; and
   a modulation section for generating a modulated signal in a predetermined modulation format in accordance with the multi-level signal, wherein
   the multi-level encoding section includes:
      a multi-level code generation section for generating, by using the predetermined key information, a multi-level code sequence in which a signal level changes so as to be random numbers; and
      a multi-level processing section for combining the multi-level code sequence and the information data in accordance with predetermined processing, and for generating the multi-level signal having a level corresponding to a combination of the multi-level code sequence and the information data,
   the multi-level code generation section includes:
      a random number sequence generation section for generating a binary random number sequence by using the predetermined key information; and
      a multi-level conversion section for generating the multi-level code sequence from the binary random number sequence in accordance with a predetermined encoding rule, and
   the predetermined encoding rule specifies that binary bit sequences respectively having predetermined lengths are caused to correspond to respective multi levels of the multi-level code sequence uniquely, and that a number of digits having different bits as a hamming distance between any adjoining binary bit sequences, which are allocated to arbitrary adjoining multi levels, is equal to the length of each of the binary bit sequences, or equal to a value less than the length of each of the binary bit sequences by 1 bit.

2. The data transmitting apparatus according to claim 1, wherein the multi-level code generation section further includes an interleaving section for performing a bit interleaving, which has a predetermined depth, on the binary random number sequence generated by the random number sequence generation section.

3. The data transmitting apparatus according to claim 2, wherein a number of columns for the bit interleaving is equal to or more than twice a degree of linear complexity of the binary random number sequence generated by the random number sequence generation section.

4. The data transmitting apparatus according to claim 2, wherein a number of rows for the bit interleaving is equal to or more than the length of each binary bit sequence allocated to each multi level.

5. The data transmitting apparatus according to claim 1, wherein the length of each binary bit sequence caused to correspond to each multi level is equal to or more than 2 bits.

6. The data transmitting apparatus according to claim 1, wherein a total number of the multi levels is equal to a power of 2.

7. The data transmitting apparatus according to claim 1, wherein the binary bit sequences having lengths identical to one another are allocated to all the multi levels.

8. The data transmitting apparatus according to claim 1, wherein the multi levels are each represented by any one of an amplitude, a frequency and a phase, or by any combination selected from thereamong.

9. A data receiving apparatus performing cipher communication, the data receiving apparatus comprising:
a memory;
a demodulation section for demodulating a modulated signal in a predetermined modulation format, and for outputting a multi-level signal; and
a multi-level decoding section for receiving predetermined key information and the multi-level signal, and for outputting information data, wherein
the multi-level decoding section includes:
a multi-level code generation section for generating, by using the key information, a multi-level code sequence in which a signal level changes so as to be random numbers; and
a multi-level decision section for performing decisions on the multi-level signal in accordance with the multi-level code sequence, and for outputting the information data,
the multi-level code generation section includes:
a random number sequence generation section for generating a binary random number sequence by using the key information; and
a multi-level conversion section for generating the multi-level code sequence from the binary random number sequence in accordance with a predetermined encoding rule, and
the predetermined encoding rule specifies that binary bit sequences respectively having predetermined lengths are caused to correspond to respective multi levels of the multi-level code sequence uniquely, and that a number of digits of different bits as a hamming distance between any adjoining binary bit sequences, which are allocated to arbitrary adjoining multi levels, is equal to the length of each of the binary bit sequences, or equal to a value less than the length of each of the binary bit sequences by 1 bit.

10. The data receiving apparatus according to claim 9, wherein the multi-level code generation section further includes an interleaving section for performing a bit interleaving, which has a predetermined depth, on the binary random number sequence generated by the random number sequence generation section.

11. The data receiving apparatus according to claim 10, wherein a number of columns for the bit interleaving is equal to or more than twice a degree of linear complexity of the binary random number sequence generated by the random number sequence generation section.

12. The data receiving apparatus according to claim 10, wherein a number of rows for the bit interleaving is equal to or more than the length of each binary bit sequence allocated to each multi level.

13. The data receiving apparatus according to claim 10, wherein the length of each binary bit sequence caused to correspond to each multi level is equal to or more than 2 bits.

14. The data receiving apparatus according to claim 10, wherein a total number of the multi levels is equal to a power of 2.

15. The data receiving apparatus according to claim 10, wherein the binary bit sequences having lengths identical to one another are allocated to all the multi levels.

16. The data receiving apparatus according to claim 10, wherein the multi levels are each represented by any one of an amplitude, a frequency, and a phase, or by any combination selected from thereamong.

17. A data communication apparatus performing cipher communication, the data communication apparatus comprising:
a data transmitting apparatus; and
a data receiving apparatus, wherein
the data transmitting apparatus includes:
a memory;
a multi-level encoding section for receiving predetermined key information and information data, and for generating a multi-level signal in which a signal level changes so as to be random numbers; and
a modulation section for generating a modulated signal in a predetermined modulation format in accordance with the multi-level signal,
the multi-level encoding section includes:
a first multi-level code generation section for generating, by using the key information, a multi-level code sequence in which a signal level changes so as to be random numbers; and
a multi-level processing section for combining the multi-level code sequence and the information data in accordance with predetermined processing, and for generating a multi-level signal having a level corresponding to a combination of the multi-level code sequence and the information data,
the first multi-level code generation section includes:
a first random number sequence generation section for generating a binary random number sequence by using the key information; and
a first multi-level conversion section for generating the multi-level code sequence from the binary random number sequence in accordance with a first encoding rule,
the first encoding rule specifies that binary bit sequences respectively having predetermined lengths are caused to correspond to respective multi levels of the multi-level code sequence uniquely, and that a number of digits of different bits as a hamming distance between any adjoining binary bit sequences, which are allocated to arbitrary adjoining multi levels, is equal to the length of each of the binary bit sequences, or equal to a value less than the length of each of the binary bit sequences by 1 bit,
the data receiving apparatus includes:
a demodulation section for demodulating a modulated signal in a predetermined format and for outputting a multi-level signal; and
a multi-level decoding section for receiving predetermined key information and the multi-level signal, and for outputting information data,
the multi-level decoding section includes:

a second multi-level code generation section for generating, by using the key information, a multi-level code sequence in which a signal level changes so as to be random numbers; and a multi-level decision section for performing decisions on the multi-level signal in accordance with the multi-level code sequence, and for outputting the information data, the second multi-level code generation section includes:
a second random number sequence generation section for generating a binary random number sequence by using the key information; and a second multi-level conversion section for generating the multi-level code sequence from the binary random number sequence in accordance with a second encoding rule, and the second encoding rule specifies that binary bit sequences respectively having predetermined lengths are caused to correspond to respective multi levels of the multi-level code sequence uniquely, and that a number of digits of different bits as a hamming distance between any adjoining binary bit sequences, which are allocated to arbitrary adjoining multi levels, is equal to the length of each of the binary bit sequences, or equal to a value less than the length of each of the binary bit sequences by 1 bit.

18. The data communication apparatus according to claim 17, wherein
the first multi-level code generation section further includes an interleaving section for performing a bit interleaving, which has a predetermined depth, on the binary random number sequence generated by the first random number sequence generation section,
the second multi-level code generation section further includes an interleaving section for performing the bit interleaving, of the predetermined depth, on the binary random number sequence generated by the second random number sequence generation section.

19. A multi-level code generation apparatus for performing cipher communication, the multi-level code generation apparatus comprising:
a memory;
a random number sequence generation section for generating a binary random number sequence by using predetermined key information; and
a multi-level conversion section for generating a multi-level code sequence from the binary random number sequence in accordance with a predetermined encoding rule, wherein
the predetermined encoding rule specifies that binary bit sequences respectively having predetermined lengths are caused to correspond to respective multi levels of the multi-level code sequence uniquely, and that a number of digits of different bits as a hamming distance between any adjoining binary bit sequences, which are allocated to arbitrary adjoining multi levels, is equal to the length of each of the binary bit sequences, or equal to a value less than the length of each of the binary bit sequences by 1 bit.

20. The multi-level code generation apparatus according to claim 19 further comprising an interleaving section for performing a bit interleaving, which has a predetermined depth, on the binary random number sequence generated by the random number sequence generation section.

21. The multi-level code generation apparatus according to claim 20, wherein a number of columns of the bit interleaving is equal to or more than twice a degree of linear complexity of the binary random number sequence generated by the random number sequence generation section.

22. The multi-level code generation apparatus according to claim 20, wherein a number of rows of the bit interleaving is equal to or more than the length of each binary bit sequence allocated to each multi level.

23. The multi-level code generation apparatus according to claim 19, wherein the length of each binary bit sequence caused to correspond to each multi level is equal to or more than 2 bits.

24. The multi-level code generation apparatus according to claim 19, wherein a total number of the multi levels is equal to a power of 2.

25. The multi-level code generation apparatus according to claim 19, wherein the binary bit sequences having lengths identical to one another are allocated to all the multi levels.

26. The multi-level code generation apparatus according to claim 19, wherein the multi levels are each represented by any one of an amplitude, a frequency, and a phase, or by any combination selected from thereamong.

* * * * *